US012633060B2

(12) United States Patent
Stepuch et al.

(10) Patent No.: US 12,633,060 B2
(45) Date of Patent: May 19, 2026

(54) GRAPHICS PROCESSING

(71) Applicant: Arm Limited, Cambridge (GB)

(72) Inventors: Rafał Stepuch, Cambridge (GB);
Philip Carlos Garcia, Austin, TX (US);
Wing-Tsi Henry Wong, Lund (SE)

(73) Assignee: Arm Limited, Cambridge (GB)

( * ) Notice: Subject to any disclaimer, the term of this
patent is extended or adjusted under 35
U.S.C. 154(b) by 188 days.

(21) Appl. No.: 18/785,282

(22) Filed: Jul. 26, 2024

(65) Prior Publication Data

US 2026/0030841 A1     Jan. 29, 2026

(51) Int. Cl.
G06T 17/20          (2006.01)
G06T 15/10          (2011.01)
(52) U.S. Cl.
CPC .............. G06T 17/20 (2013.01); G06T 15/10
(2013.01)
(58) Field of Classification Search
None
See application file for complete search history.

(56) References Cited

U.S. PATENT DOCUMENTS

| | | | | |
|---|---|---|---|---|
| 5,969,726 A | * | 10/1999 | Rentschler | ............ G06T 15/005 |
| | | | | 345/506 |
| 6,469,704 B1 | * | 10/2002 | Johnson | .................. G06T 15/00 |
| | | | | 345/553 |
| 6,631,423 B1 | * | 10/2003 | Brown | .................. G06T 15/005 |
| | | | | 719/321 |
| 8,941,669 B1 | * | 1/2015 | Moreton | ................. G06F 9/505 |
| | | | | 345/503 |
| 2020/0111247 A1 | * | 4/2020 | Heggelund | ........... G06T 15/405 |
| 2021/0065422 A1 | * | 3/2021 | Croxford | ................ G06T 15/20 |
| 2023/0306660 A1 | | 9/2023 | Stepuch et al. | |
| 2023/0306661 A1 | * | 9/2023 | Stepuch | .................. G06T 11/40 |

* cited by examiner

*Primary Examiner* — Nurun Flora
(74) *Attorney, Agent, or Firm* — Pearl Cohen Zedek
Latzer Baratz LLP

(57)          ABSTRACT

Disclosed herein are techniques for storing primitive state
data associated with primitives within a sequence of primi-
tives using variable format commands in which the com-
mand format that is used is selected based on which prop-
erties (attributes) are enabled for the sequence of primitives
in question. Thus, a same opcode command can be used to
store different types of state data corresponding to different
ones of the properties (attributes) that can be enabled for a
sequence of primitives based on which properties (attri-
butes) are actually enabled for the sequence of primitives in
question.

21 Claims, 7 Drawing Sheets

| ID | Name | Type | Short Description | Layout | Opcode length | Total command length (including opcode) |
|---|---|---|---|---|---|---|
| op_0 | prim8 | prim | Encodes vertex indices | fixed | 1 | 8 |
| op_1 | prim16 | prim | Encodes vertex indices | fixed | 2 | 16 |
| op_2 | meta0 | state (meta) | Encodes 4-bit VRS (Variable Rate Shading) rate, 4-bit viewport index and 8-bit layer index | selectable per draw call | 4 | selectable per draw call |
| op_3 | ts8 | state (meta) | Encodes timestamp (short command) used for ordering primitives in Hierarchical Tiling | fixed | 4 | 8 |
| op_4 | cvg8 | state (meta) | Encodes tile coverage mask | fixed | 5 | 8 |
| op_5 | pid8 | state (meta) | Encodes relative value of primitive ID (short command) | fixed | 5 | 8 |
| op_6 | pid32 | state (meta) | Encodes full value of primitive ID | fixed | 8 | 32 |
| op_7 | prim32 | prim | Encodes vertex indices | fixed | 5 | 32 |
| op_8 | cfg0 | cfg | Configuration sequence 0 | fixed | 8 | 32+ |
| op_9 | cfg1 | cfg | Configuration sequence 1 | fixed | 8 | 32+ |

Fig. 4

| Attributes enabled | Single Command length (in bits) | Single Command Layout | Max. No. of Commands that can be repeated | Layout when Max. No. of Commands is used |
|---|---|---|---|---|
| vrs_rate=yes, layer_index=no, viewport_index=no | 8 | op_2, vrs_rate(4 bits) | 1 | op_2, vrs_rate{bits[3:0]} |
| vrs_rate=no, layer_index=yes, viewport_index=no | 8 | op_2, layer_index(4 bits) | 2 | op_2, layer_index{bits[3:0]}; op_2, layer_index{bits[7:4]} |
| vrs_rate=no, layer_index=no, viewport_index=yes | 8 | op_2, viewport_index(4 bits) | 1 | op_2, viewport_index{bits[3:0]} |
| vrs_rate=yes, layer_index=yes, viewport_index=no | 8 | op_2, layer_index(2 bits), vrs_rate(2 bits) | 4 | op_2, layer_index{bits[1:0]}, vrs_rate{bits[1:0]}; op_2, layer_index{bits[3:2]}, vrs_rate{bits[3:2]}; op_2, layer_index{bits[5:4]}, layer_index{bits[7:6]}, NULL(2 bits) |
| vrs_rate=yes, layer_index=no, viewport_index=yes | 8 | op_2, vrs_rate(2 bits), viewport_index(2 bits) | 2 | op_2, vrs_rate{bits[1:0]}, viewport_index{bits[1:0]}; op_2, vrs_rate{bits[3:2]}, viewport_index{bits[3:2]} |
| vrs_rate=no, layer_index=yes, viewport_index=yes | 8 | op_2, layer_index(2 bits), viewport_index(2 bits) | 4 | op_2, layer_index{bits[1:0]}, viewport_index{bits[1:0]}; op_2, layer_index{bits[3:2]}, viewport_index{bits[3:2]}; op_2, layer_index{bits[5:4]}, NULL(2 bits); op_2, layer_index{bits[7:6]}, NULL(2 bits) |
| vrs_rate=yes, layer_index=yes, viewport_index=yes | 16 | op_2, layer_index(4 bits), vrs_rate(4 bits), viewport_index(4 bits) | 2 | op_2, layer_index{bits[3:0]}, vrs_rate{bits[3:0]}, viewport_index{bits[3:0]}; op_2, layer_index{bits[7:4]}, NULL(8 bits) |

Fig. 5

GRAPHICS PROCESSING

BACKGROUND

The technology described herein relates to graphics processing systems, and in particular to methods and systems for use when processing graphics primitives in graphics processing systems in which a render output is sub-divided into a plurality of tiles for rendering (e.g. so-called "tile-based" graphics processing systems).

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons such as triangles, quadrilaterals, points, lines or groups thereof.

Each primitive is usually defined by and represented as a set of vertices (e.g. three vertices in the case of a triangular primitive). The vertices that are to be used for the primitives will have respective sets of vertex data defining the vertices, e.g. the relevant attributes for each of the vertices. These attributes will typically include position data and other, non-position data (varyings), e.g. defining colour, light, normal, texture coordinates, etc., for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices.

For a given frame, there may, e.g., be of the order of a few thousand draw calls, and hundreds of thousands (or potentially millions) of primitives.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

One form of graphics processing uses so-called "tile-based" rendering. In tile-based graphics processing, the two-dimensional graphics processing (render) output (i.e. the output of the rendering process, such as an output frame to be displayed) is generated (rendered) as a plurality of smaller area regions, usually referred to as "tiles". The render output is typically divided (by area) into regularly-sized and shaped rendering tiles (they are usually e.g. squares or rectangles). The tiles are each rendered separately (e.g. one after another). The rendered tiles are then combined to provide the complete render output (e.g. frame for display). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

When performing tile-based graphics processing, there will normally be some initial geometry processing, such as vertex processing (vertex shading) of attributes for vertices to be used for primitives for the render output being generated, to generate geometry (and other) data required for rendering the graphics processing output. The geometry processing will then be followed by a sorting (e.g. tiling/binning) process that 'sorts' the geometry (primitives) for the render output being generated, e.g., into respective regions of the render output area. This sorting allows the geometry (primitives) that need to be processed for a given region of the render output to be identified (so as to, e.g., avoid unnecessarily rendering primitives that are not actually present in a region).

The sorting (e.g. tiling/binning) process thus generates appropriate data structures for determining which geometry (e.g. primitives) needs to be processed for respective rendering tiles of the output being generated.

For example, respective "primitive" lists may be produced identifying for respective regions (which regions may correspond to rendering tiles, but need not, and in general a render output region for which a primitive list is prepared could be a single rendering tile, or a group of plural rendering tiles, etc.) which primitives need to be rendered for that region (these lists may also commonly be referred to as "polygon" or "tile" lists).

Once such primitive lists have been prepared for all the render output regions, each rendering tile is processed, by rasterising and rendering the primitives listed for the region of the render output corresponding to the rendering tile.

The primitive lists prepared in this way, once prepared, can thus then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive list being used accordingly to identify the primitives to be rendered for each rendering tile when generating the desired render output, e.g. to display the frame.

As well as identifying respective primitives to be rendered for the associated render output regions, a primitive list may also include other data (e.g. primitive metadata (or state data)) that is to be used when rendering the identified primitive to generate the desired render output (e.g. a frame for display).

The Applicants believe however that there remains scope for improvements in how data is arranged and stored for use by graphics processing systems.

BRIEF DESCRIPTION OF DRAWINGS

Various embodiments will now be described by way of example only and with reference to the following figures, in which:

FIG. 4 shows a summary of commands that can be included into a primitive list having the primitive list format according to an embodiment of the technology described herein;

FIG. 5 is a table showing the format of a particular 'variable' state type command according to an embodiment of the technology described herein;

DETAILED DESCRIPTION

Figure 1:
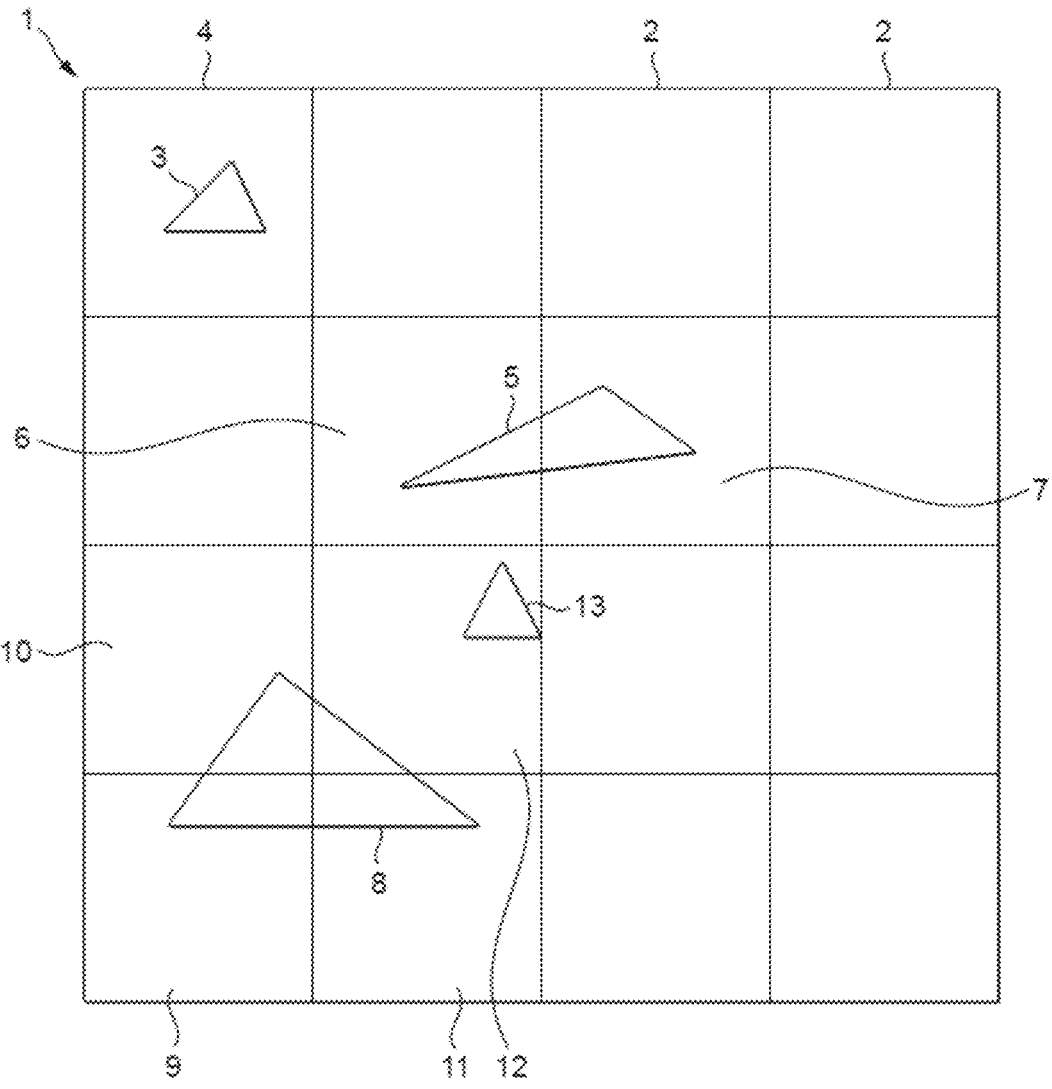
FIG. 1 shows schematically a tile-based graphics processing arrangement.

A first embodiment of the technology described herein comprises a method of operating a graphics processor to generate a render output in which the render output is sub-divided into a plurality of tiles for rendering, the method comprising:

performing a first, geometry sorting pass to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of (variable) state command that is operable and configured to variably store different types of state data relating to a certain set of properties that can be selectively enabled for a given sequence of primitives based on which of those properties are enabled for the sequence of primitives to which that state data relates;

the method further comprising:

thereafter performing a second, rendering pass to render the tiles into which the render output is sub-divided for rendering, wherein the second, rendering pass uses the data structures produced by the first, geometry sorting operation to determine which primitives within the sequence of primitives to render for which tiles, whereby for a tile to be rendered, the method comprises:

obtaining a respective data structure relating to a region of the render output encompassed by that tile and decoding the commands within the respective data structure to determine the primitive data and associated state data to be used when rendering that tile, wherein when such a particular type of (variable) state command is encountered within the data structure, the particular type of (variable) state command is decoded based on which of the one or more properties of the set of properties that can be selectively enabled for a sequence of primitives are enabled for the sequence of primitives to which the state data relates.

A second embodiment of the technology described herein comprises a graphics processing system including a graphics processor that is operable to generate a render output in which the render output is sub-divided into a plurality of tiles for rendering, the graphics processor comprising:

a geometry sorting circuit that is operable and configured to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of (variable) state command that is operable and configured to variably store different types of state data relating to a certain set of properties that can be selectively enabled for a given sequence of primitives based on which of those properties are enabled for the sequence of primitives to which that state data relates; and a rendering circuit that is operable and configured to render the tiles into which the render output is sub-divided for rendering, wherein the rendering circuit includes a reading circuit that is configured to read in data structures produced by the geometry sorting circuit to determine which primitives within the sequence of primitives to render for which tiles, whereby for a tile to be rendered, the reading circuit is configured to:

obtain a respective data structure relating to a region of the render output encompassed by that tile and decode the commands within the respective data structure to determine the primitive data and associated state data to be used when rendering that tile, wherein when such a particular type of (variable) state command is encountered within the data structure, the reading circuit decodes the particular type of (variable) state command based on which of the one or more properties of the set of properties that can be selectively enabled for a sequence of primitives are enabled for the sequence of primitives to which the state data relates.

The technology described herein in these embodiments relates to so-called "tile-based" graphics processing systems in which a render output (e.g. a frame for display) is sub-divided into a plurality of (smaller) regions for rendering, which regions will be referred to herein as (rendering) "tiles", each tile including a respective area of the render output. The respective tiles into which the render output is sub-divided for rendering can then be rendered separately, e.g. in parallel.

To facilitate this, the graphics processing system is configured, e.g. in a first processing pass, to perform a geometry sorting operation that effectively sorts the geometry that is defined for the render output.

In the technology described herein the geometry is defined in terms of one or more sequences of graphics 'primitives' (where a sequence of primitives may, e.g., correspond to a (single) draw call, or packet of primitives, and wherein they may generally be a plurality of such sequences of primitives to be processed for a given render output). Thus, in embodiments, the first, geometry sorting pass sorts the primitives (within the sequences of primitives to be processed for a render output). In embodiments the sorting is performed to sort the (sequences of) primitives into respective different regions of the render output.

As will be explained further below, these regions may be, and in some embodiments are, regions into which the render output has been sub-divided for the purpose of sorting the primitives. Other arrangements would however be possible, and the regions could, for example, in other embodiments, correspond to bounding boxes encompassing groups of primitives.

The result of this geometry sorting operation is thus generally to produce a corresponding set of data structures that can be used to identify which of the primitives in the sequence of primitives defined for the render output are to be rendered for respective different regions of the render output, i.e. for the different tiles into which the render output is divided for rendering.

These data structures may, e.g., be in the form of so-called "primitive lists" (also be referred to as "tile-lists", or polygon lists, but the term "primitive lists" will primarily be used herein) that are prepared for respective (static/predetermined) regions into which the render output has been specifically sub-divided for the purpose of sorting the primitives, e.g. as part of a tiling/binning operation, e.g. in the normal manner for tile-based rendering.

However, other arrangements would be possible, and the data structures of the technology described herein could also be generated in other ways, such as when constructing a hierarchy of bounding boxes representing the distribution of primitives, with each bounding box corresponding to a respective group of primitives (or primitive packets) that are encompassed within that bounding box (in which case as mentioned above the respective regions for which the data structures are produced correspond to the area encompassed by the respective bounding box).

In this respect, it should be noted that a given data structure (e.g. primitive list) may be prepared for any suitable regions of the render output. In other words, the regions into which the render output is divided for the geometry sorting purpose may or may not directly correspond to the regions (i.e. "tiles") into which the render output is divided for rendering. Likewise, a given rendering tile may be associated with more than one of such data structures (e.g. where the geometry sorting operation is performed in a hierarchical manner), in which case information from multiple data structures may need to be suitably merged in order to determine which primitives are to be rendered for the tile, and in which order.

Various examples are possible in this regard, e.g. depending on how the render output is divided for processing and how the geometry sorting is performed.

Once the geometry has been appropriately sorted relative to the render output, the graphics processor will then perform the actual rendering of the tiles making up the overall render output in a second, "deferred" processing (rendering) pass in which the primitives to be rendered for the different regions are identified using the respective data structures that were produced by the first, geometry sorting pass. Thus, once all of the data structures for all of the regions for which data structures are to be produced have been prepared, and the primitives sorted accordingly, the data structures can then be (and are) read back into the graphics processor and used to perform the rendering of the respective rendering tiles to generate the render output.

The data structures according to the technology described herein thus generally store (primitive) data identifying the individual primitives that are to be rendered for the respective region of the render output to which the data structure relates. In addition to such (primitive) data identifying individual primitives to be rendered, the data structures according to the technology described herein can, and typically will, also store certain items of 'state data' (i.e. primitive properties or 'metadata') associated with the primitives and that is usable to control certain processing operations to be performed when rendering the individual primitives. The state data is thus used when rendering the associated primitives to which that state data applies.

There are various examples of types of state data that may desirably be included into the data structures according to the technology described herein, e.g. as will be discussed below. In general a data structure produced according to the technology described herein may include any suitable and desired types of state data.

This state data is typically included into the data structures according to the technology described herein in association with the respective primitive data identifying the primitive or primitives to which the state data relates.

For instance, the data structures produced according to the technology described herein generally comprises respective sequences of 'commands' for storing the data that is desired to be stored in that data structure.

Accordingly, a (and each) data structure according to the technology described herein may, and typically will, comprise one or more sequences of commands, wherein each sequence of commands corresponds to a respective one of the sequences of primitives to be processed for the render output, and is configured for storing data for that sequence of commands that is relevant to the particular region that the data structure relates to.

For instance, as mentioned above, there may be a plurality of sequences of primitives to be processed for a given render output, with each sequence of primitives corresponding to a respective draw call, or respective primitive packet, etc., depending on the graphics processing system in question.

The first, geometry sorting pass in embodiments processes each of the sequences of primitives to be processed in turn and encodes the relevant data for each sequence of primitives into the respective data structures that are produced by the first, geometry sorting pass.

Thus, the first, geometry sorting pass will process a first sequence of primitives (e.g. draw call/packet) to sort the primitives in that first sequence of primitives relative to regions of the render output, and as part of that, will include data relating to the primitives in the first sequence of primitives as needed into the respective data structures. Thus, if a primitive in the first sequence of primitives needs to be added into a data structure for a particular region, this will be done. Once the first sequence of primitives has been sorted appropriately and the relevant data structures populated, the first, geometry sorting pass will then process a second (next) sequence of primitives, and so on, adding data relating to the primitives in the second (next) sequence of primitives into the relevant data structures, as needed.

Thus, a given data structure produced according to the technology described herein may, and typically will, include data relating to multiple different sequences of primitives, with each different sequence of primitives for which data is included having a respective identifiable sequence of commands.

Typically the different sequences of commands corresponding to the different sequences of primitives are included sequentially with suitably demarking commands included, e.g. to indicate that the following sequence of commands corresponds to a new sequence of primitives. This can be done by including into the data structure a suitable configuration type command, for example, as will be explained further below.

A (and each) sequence of commands (i.e. corresponding to a particular sequence of primitives) included into a respective data structure is thus configured to store any data for its associated sequence of primitives that is relevant for the particular region that the data structure relates to.

In this respect, according to the technology described herein, there are a plurality of respective (different) command types that are available (and dedicated) for storing different respective types of data. That is, there is a (finite/limited) set of different available command types, with different command types being operable and configured for storing different types of data. In general, there may be any suitable number of command types available.

For example, as mentioned above, the available command types may include certain 'configuration type' commands that can be included to identify (new) sequences of commands (i.e. corresponding to different sequences of primitives) and that can be used for storing certain types of (configuration) data that may apply to larger (groups of) sets of primitives, e.g. for an entire sequence of primitives being processed (e.g. an entire draw call, or primitive packet).

As will be explained further below, the available command types will also include at least one 'primitive type' command for storing (primitive) data identifying individual primitives that are to be rendered.

Thus, a data structure produced according to the technology described herein will typically include a number of primitive type commands storing a first type of data ("primitive data") identifying individual primitives that are to be rendered for the region of the render output to which the primitive list relates.

The available command types also include 'state type' commands for storing certain items of state data to be used when rendering associated primitives (and in general there may be multiple different state type commands available and configured for storing different types of state data).

A data structure produced according to the technology described herein may therefore, and typically will, also include a number of state type commands storing a second type of data ("state data") associated with processing operations to be performed when rendering individual primitives, wherein the second type of data may apply to sets of one or more primitives.

A suitable state type command can thus be included into the data structure before (e.g. immediately before) a following sequence of one or more primitive type commands identifying a set of primitives that will use that state data.

Similarly, a suitable configuration type command can be included into the data structure before (e.g. immediately before) a following sequence of state type and primitive type commands to which that configuration data applies.

These different types of commands accordingly may, e.g., and in embodiments do, differ in terms of how frequently they are included into a data structure. For example, a respective primitive type command will in embodiments be included into the data structure for each individual primitive that is to be rendered for the region to which the data structure relates, whereas state type commands may only need to be included where there has been a change in the state between primitives. Similarly, a configuration type command may only need to be included where there has been a change in the state between primitives, i.e. to indicate the start of a new sequence of commands (i.e. corresponding to a different sequence of primitives).

That is, different types of data may have different effective 'lifetimes' within the rendering process, and so it may be efficient to use separate types of commands for storing these different types of data (and this is accordingly done according to the technology described herein).

There may of course also be various other types of commands included into a data structure produced according to the technology described herein, as desired.

In this regard, in general, and subject to the particular requirements of the technology described herein, the data structures according to the technology described herein may include any of the (types of) commands that are described in United States Patent Application Publication No. US 2023/0306660 (Arm Limited), and the entire contents of this document in this respect are incorporated herein by reference.

Various other examples would however be possible.

The different types of commands may generally have any suitable and desired layout and/or length, e.g. depending on the type of data that the commands are designed to store.

In embodiments, however, each of the commands comprises at least a first portion storing a respective command type identifier identifying that the command is a certain type of command (which command type identifier may, e.g., and in embodiments does, comprise a respective operation code (opcode) associated with that command type).

A (and each) command that is included into a data structure according to the technology described herein thus in embodiments has an associated command type identifier that is usable to identify which type of command from the available set of different types of commands the command corresponds to.

Each of the commands in embodiments also comprises a second portion storing some or all of the data in question (the payload). In this respect, depending on the size (length) of the command and the amount of data to be stored, it will be appreciated that multiple commands of the same type may be needed to store the full payload. Thus, commands may be repeated to achieve this.

Various arrangements would of course be possible in this regard depending on the particular command layout and the type of data that the command is operable and configured to store.

In this respect, it will be appreciated that different types of commands may, and typically will, have different command formats (i.e. sizes (lengths) and layouts), e.g. which command formats may be better optimised for storing the associated data that the type of command is designed for storing (e.g. rather than using a single common command format that may therefore be less appropriate for all different types of data that might need to be stored).

Different (types of) commands may thus have different formats (e.g. different layouts and/or sizes (lengths) for storing the respective different types of data and the particular format (layout) for a given command may thus be determined based on the respective identifier (opcode) for that command.

In embodiments, each of the different types of commands thus has a respective (unique) command type identifier that can be used to identify that a given command is a command of that type, and hence can be used to decode the data that is stored using that command appropriately. That is, based on the type of command (as determined from the command type identifier), the graphics processor (decoding) can then determine an expected format (i.e. layout and/or size (length)) for that type of command and extract the data accordingly based on the expected command format, e.g. in the normal manner for processing such commands.

During the first, geometry sorting pass, the graphics processor thus processes the sequences of primitives to produce such data structures, and encodes the required (primitive) data into such data structures by including into such data structures appropriate sequences of commands.

As mentioned above, once the first, geometry sorting pass has been performed to sort the primitives within a particular sequence of primitives relative to the render output (regions), the graphics processor will then perform a corresponding second, rendering pass to render the tiles into which the render output is sub-divided for rendering. The second, rendering pass uses the data structures produced by the first, geometry sorting pass to determine which primitives to render for which tiles.

During the second, rendering pass, when rendering a tile, the graphics processor will thus read the corresponding data structures for any regions of the render output that overlap the tile in question, and thus identify (from the respective primitive type commands) which primitives within the sequence of primitives to render for which tiles.

The graphics processor (rendering circuit) will thus comprise a suitable reading circuit (e.g. a primitive list reader) that is operable and configured to do this. Thus, the reading circuit of the graphics processor (rendering circuit), when reading a corresponding data structure is operable and configured to read (and suitably decode) the primitive type commands included in that data structure to determine the primitives that are to be rendered.

Similarly, the graphics processor when reading the corresponding data structures for a region will also identify (from the respective state type commands) any associated state data to be used when rendering the primitives that are indicated to be rendered for that region. The reading circuit of the graphics processor (rendering circuit) is thus also operable and configured to read (and decode) any respective state type commands included in that data structure to determine the state data associated with the processing operations to be performed when rendering those primitives.

Thus, as described above, a (and each) respective data structure produced according to the technology described herein may, and typically will comprise a respective sequence of commands including a set of one or more 'primitive type' commands for storing (primitive) data identifying the individual primitives that are to be rendered for the region of the render output to which the data structure relates and further including one or more 'state type' commands for storing respective state data associated with respective processing operations to be performed when rendering those primitives.

The technology described herein relates particularly to how the data identifying and describing the primitives to be rendered is stored and arranged within such data structures using such commands.

More particularly, the technology described herein relates to an improved (variable) encoding of certain types of state data that relate to features (or attributes) that can be selectively enabled (or not) for a given sequence of primitives being processed.

In this respect, it will be appreciated that some types of 'state data' may particularly relate to certain properties that can be selectively enabled (or not) for a given sequence of primitives to be processed. For example, there are certain API features, for instance, that can be selectively enabled (e.g. by the application programmer), on a per-draw call basis (although for the purposes of the technology described herein the properties could generally be enabled for any suitably defined group of primitives, such as a primitive packet, etc., as desired depending on the particular graphics processor (and graphics processing system) in question).

When one of these features is enabled for a particular sequence of primitives, a suitable flag or other indicator may thus be set (e.g. by a driver for the graphics processor) to indicate to the graphics processor that the feature is enabled, and the graphics processor may then be caused to perform suitable processing operations based on that feature being enabled.

Correspondingly, when such features are enabled, appropriate state data defining the relevant primitive properties (attributes) that are to be used for the processing operations associated with those features may accordingly be included into the data structures according to the technology described herein.

Examples of types of state data relating to properties or features that can be selectively enabled for a sequence of primitives, and that may therefore suitably be included into the data structures according to the technology described herein may, for instance, and in embodiments do, include any, and in embodiments, each of:

(i) a variable shading rate (indicating a rate of shading that is to be used when rendering (shading) the primitive, when variable rate shading is enabled);

(ii) a layer index (indicating a layer index that is to be used, when this feature is enabled); and (iii) a viewport index (indicating a viewport index that is to be used to select the viewport transform, when this feature is enabled).

Thus, when variable rate shading is enabled, a respective variable shading rate may be specified for a set of one or more primitives, which specified variable shading rate should then be used when rendering those primitives.

Similarly, when layer and/or viewport transform features are enabled, a respective layer and/or viewport index (property) may be specified for a set of one or more primitives, which specified layer and/or viewport index should then be used when rendering those primitives.

There are of course various other examples of properties or features that may be selectively defined and enabled for a sequence of primitives (e.g. on a per-draw call or per-packet basis) (and for which the corresponding state data relating to those properties in embodiments may therefore also be handled in the same manner according to the technology described herein). For instance, other examples of properties that may be selectively enabled for a sequence of primitives might include a primitive identifier value or a (primitive) point size and/or line width that is to be used for a particular sequence of primitives.

Thus, when such properties are enabled for a sequence of primitives, corresponding items of state data, i.e. defining the respective primitive properties (values) associated with such properties that are to be used for a respective set of primitives, can then be, and in embodiments are, included appropriately into a (and each) data structure produced according to the technology described herein, as needed.

(Whereas, if these optional properties or features are not enabled for a particular sequence of primitives, no such state data needs to be included (and so in embodiments this is avoided).)

As described above, in the technology described herein, such state data is included into the data structures produced according to the technology described herein by including into the data structures appropriate state type commands for storing that data.

In particular, according to the technology described herein, a (single) same particular state type command is provided that is operable and configured to variably store different types of state data relating to a certain set of properties that can be selectively enabled for a sequence of primitives (i.e. state type of the type discussed above) based on which of those properties are enabled for the sequence of primitives that is currently being processed (this particular type of state command will also be referred to herein as "variable state" command).

That is, according to the technology described herein, there is a (single) same particular (variable) state type command, i.e. that can be identified using a particular (unique) identifier (opcode), that can be used to store different types of state data relating to a certain set of properties that can be selectively enabled for a sequence of primitives. This is in contrast, for example, to each of those different types of state data having its own dedicated state type command (each having its own unique identifier (opcode)).

Further, this is done in a variable manner. That is, rather than this particular state type command simply always reserving space for storing all of the multiple different types of state data relating to the certain set of properties that can be selectively enabled for a sequence of primitives (regardless of whether or not there is any such state data to be stored, i.e. regardless of whether or not the related property is enabled for the current sequence of primitives), the particular (variable) state type command has a variable command format so that which data is stored, and in embodiments also the format (i.e. layout and/or size (length)) that is used for storing that data, is determined based on which one or more properties of the certain set of properties that can be selectively enabled for a sequence of primitives are actually enabled for the sequence of primitives to which the state data relates.

Thus, the (single) same particular (variable) state type command is operable and configured to store any (or all)

state data that relates to a certain set of properties that can be selectively enabled for a sequence of primitives.

For example, as discussed above, examples of this type of state data may include state data indicating a variable shading rate (when variable rate shading is enabled), state data indicating a layer index (when this is enabled), and state data indicating a viewport index (when this is enabled). In embodiments, the particular (variable) state type command according to the technology described herein is thus operable and configured to store any or all of these particular types of state data.

In general, however, the particular (variable) state type command according to the technology described herein may be operable and configured to store any other suitable state data, as desired.

Various examples would of course be possible in this regard.

Thus, in the graphics processing systems of the technology described herein, there is a certain set of properties that can be selectively enabled (or not) for a sequence of primitives to be processed (and these properties can generally be enabled independently of one another). In the technology described herein, a (single) same particular (variable) state type command is then used to store state data relating to any (and all) of those properties, as appropriate.

However, rather than that particular (variable) state type command simply always storing (or providing space for) state data for all of the different properties, the command format is variable based on which properties are actually enabled. Thus, depending on which (combinations of) properties of the certain set of properties that can be selectively enabled for a sequence of primitives are enabled for the sequence of primitives being processed, the (payload) data may be arranged in different ways.

Thus, when processing a given sequence of primitives during the first, geometry sorting pass, the graphics processor will determine which (if any) of the properties in the certain set of properties that can be selectively enabled (or not) for a sequence of primitives to be processed are enabled for the current sequence of primitives. This determination can be performed, for example, by checking a suitable flag or indicator that is provided to indicate this, although other arrangements would of course be possible.

The graphics processor will then determine on this basis an appropriate command format to be used for the particular (variable) state type command described above and for any items of state data that are to be encoded using this particular (variable) state type command, that state data will then be encoded into the data structure according to the determined command format by including into the data structure at least one such of that particular (variable) state type command having the determined command format.

As mentioned above, the particular properties (if any) within the certain set of properties that are enabled may, and typically will, vary between different sequences of primitives.

Thus, for each different sequence of commands included into a given data structure (i.e. for each different sequence of primitives), a respective command format to be used for the particular state type command described above (i.e. the variable state command) is determined, and any state data that is to be stored using such command is then encoded appropriately using the determined command format for that sequence of commands (i.e. sequence of primitives).

Thus, a same data structure may include multiple instances of the same particular (variable) state type command, but different instances of that particular (variable)

state type command may have different command formats based on which properties are enabled for the sequence of commands (i.e. primitives) the particular (variable) state type command relates to.

This then means that the decoding of the (variable) state type commands cannot simply be performed on the basis of the respective identifier (opcode) for the command (alone), e.g. as would normally be done, but when such particular (variable) state type commands are present, the decoding of such commands should also, and in the technology described herein does, take into account the appropriate command format based on which properties of the set of properties that can be selectively enabled for a sequence of primitives are enabled for the sequence of primitives to which the particular (variable) state type command relates.

For instance, when producing the data structures according to the technology described herein, an indicator of the command format that was used for the particular state type command for a sequence of commands (primitives) can be, and in embodiments is, included into the data structure in association with that sequence of commands (primitives). This can be done for instance by including an indicator of the command format (or, an indicator of which properties were enabled, to allow the command format to be determined) into a suitable configuration type command at the start of a particular sequence of commands, at least if the command format has changed relative to the previous sequence of commands.

The indicated command format can then be used for decoding any such commands in the following sequence of commands.

Various arrangements would be possible in this regard.

The use of a (single) same particular state type command that can variably store different types of state data means that only a single command identifier (opcode) needs to be reserved in relation to all of those different types of state data (e.g. rather than each of the different types of state data having its own dedicated command, thus requiring separate identifiers (opcodes) to be reserved for each different type of state data).

An effect and benefit of this is then to in embodiments reduce the range of (unique) identifiers (opcodes) that need to be reserved. This can in turn reduce the size of the portions of the commands used to store the respective identifiers (opcodes) (and hence facilitate smaller data structures).

It will be appreciated that using a (single) same particular state type command may on the other hand offer reduced flexibility, e.g., compared to having dedicated commands for each different type of state data.

In this respect, however, the present Applicants recognise that in typical graphics processing applications, any optional (API) features or properties that can be enabled for a particular sequence of primitives are often not enabled (or at least not enabled together). Thus, when a particular type of state command is usable to variably store state data relating to a certain set of such properties that can be selectively enabled, most of the time it is expected that (only) zero or one of those properties will be enabled for a given sequence of primitives (and the properties that are included into the set of properties may be suitably selected such that this is the case).

This means that always reserving space for all of that data (e.g. by packeting all of this state data into a single, fixed format command) is likely to be inefficient since most of the time only some of that data will actually need to be stored, and it is difficult to provide a single fixed format that is optimised for different types of state data. However, using separate dedicated state commands for each type of state data is also inefficient in terms of needing to reserve more identifiers (opcodes), even though most of the time those identifiers (opcodes) will not be needed (since these commands are expected to be included relatively infrequently).

Thus, by providing a particular type of state command that can variably store different types of state data relating to such optional properties in a manner that is dependent on which properties are enabled for the current sequence of primitives may be relatively more efficient overall at least for typical graphics processing workloads where it is expected that most of the time a given sequence of primitives will only have zero or one such properties enabled.

The technology described herein may therefore provide various benefits compared to other possible approaches.

Whilst embodiments are described above in relation to the overall graphics processing system (and process), it will be appreciated that the technology described herein also extends to the encoding side operation itself.

Another embodiment of the technology described herein comprises a method of operating a graphics processor to generate a render output in which the render output is sub-divided into a plurality of tiles for rendering, the method comprising:

performing a first, geometry sorting pass to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of (variable) state command that is operable and configured to variably store different types of state data relating to a certain set of properties that can be selectively enabled for a given sequence of primitives based on which of those properties are enabled for the sequence of primitives to which that state data relates.

Yet another embodiment of the technology described herein comprises a graphics processing system including a graphics processor that is operable to generate a render output in which the render output is sub-divided into a plurality of tiles for rendering, the graphics processor comprising:

a geometry sorting circuit that is operable and configured to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of (variable) state command that is operable and configured to variably store different types of state data relating to a certain set of properties that can be selectively enabled for a given sequence of primitives based on which of those properties are enabled for the sequence of primitives to which that state data relates.

The technology described herein also relates to the decoding side operation itself.

Another embodiment of the technology described herein comprises a method of operating a graphics processor to generate a render output in which the render output is sub-divided into a plurality of tiles for rendering, in which the graphics processor is operable and configured to:

perform a first, geometry sorting pass to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of (variable) state command that is operable and configured to variably store different types of state data relating to a certain set of properties that can be selectively enabled for a given sequence of primitives based on which of those properties are enabled for the sequence of primitives to which that state data relates;

and in which the method comprises:

thereafter performing a second, rendering pass to render the tiles into which the render output is sub-divided for rendering, wherein the second, rendering pass uses the data structures produced by the first, geometry sorting operation to determine which primitives within the sequence of primitives to render for which tiles, whereby for a tile to be rendered, the method comprises:

obtaining a respective data structure relating to a region of the render output encompassed by that tile and decoding the commands within the respective data structure to determine the primitive data and associated state data to be used when rendering that tile, wherein when such particular type of (variable) state command is encountered within the data structure, such particular type of (variable) state command is decoded based on which of the one or more properties of the set of properties that can be selectively enabled for a sequence of primitives are enabled for the sequence of primitives to which the state data relates.

Another embodiment of the technology described herein comprises a graphics processing system including a graphics processor that is operable to generate a render output in which the render output is sub-divided into a plurality of tiles for rendering, the graphics processor comprising:

a geometry sorting circuit that is operable and configured to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of 'primitive type' commands for storing (primitive) data identifying individual primitives that are to be rendered for the region of the render output to which the data structure relates and further including one or more 'state type' commands for storing state data associated with respective processing operations to be performed when rendering those primitives, wherein there is a set of different available command types that can be included into the data structure for storing different types of data, and wherein the set of different available command types includes a particular type of state command that is operable and configured to variably store different types of state data relating to a certain set of properties that can be selectively enabled for a given sequence of primitives based on which of those properties are enabled for the sequence of primitives to which that state data relates; and a rendering circuit that is operable and configured to render the tiles into which the render output is sub-divided for rendering, wherein the rendering circuit includes a reading circuit that is configured to read in data structures produced by the geometry sorting circuit to determine which primitives within the sequence of primitives to render for which tiles, whereby for a tile to be rendered, the reading circuit is configured to:

obtain a respective data structure relating to a region of the render output encompassed by that tile and decode the commands within the respective data structure to determine the primitive data and associated state data to be used when rendering that tile, wherein when such particular type of state command is encountered within the data structure, the reading circuit decodes such particular type of state command based on which of the one or more properties of the set of properties that can be selectively enabled for a sequence of primitives are enabled for the sequence of primitives to which the state data relates.

It will be appreciated that these further embodiments of the technology described herein relating to the encoding and decoding side operations may, and in embodiments do, also contain any or all optional features of the technology described herein described herein. Thus, the decoding is in embodiments performed subsequently to the encoding as part of a single graphics processing operation. However, in principle these operations could be performed separately.

More generally, the approach according to the technology described herein of using a (single) same particular state type command to variably store multiple different types of state data may find utility in other situations where it is desired to store primitive type and state type data together as part of a single data structure.

That is, whilst the technology described herein finds particular utility in the context of producing such data structures as part of an initial geometry sorting pass, e.g. as described above, the technology described herein is not necessarily limited to such contexts, and it is believed that the particular encoding and decoding operations described above are novel and advantageous in their own rights, regardless of the particular graphics processing system in question.

Thus, another embodiment of the technology described herein comprises a method of processing (e.g. encoding) data for use by a graphics processor when generating a render output, the method comprising:

processing one or more sequences of primitives to produce, for respective sets of primitives within the one or more sequences of primitives, respective data structures storing data to be used when rendering the respective set of primitives to which the data structure relates, wherein a respective data structure for a given set of primitives comprises one or more sequences of commands, each sequence of commands corresponding to a respective one of the sequences of primitives being processed, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein a particular type of state command is operable and configured to variably store different types of state data relating to a certain set of properties that can be selectively enabled for a given sequence of primitives based on which of those properties are enabled for the sequence of primitives to which that state data relates.

In embodiments, the method thus further comprises:

for a sequence of primitives for which a corresponding sequence of commands is to be included into a respective data structure:

determining, based on which one or more properties of the certain set of properties that can be selectively enabled for a given sequence of primitives are enabled for the sequence of primitives, a respective command format for such particular type of state command that is to be used for the sequence of commands corresponding to that sequence of primitives.

Yet another embodiment of the technology described herein comprises an encoder (circuit) that is operable and configured to:

process one or more sequences of primitives to produce, for respective sets of primitives within the one or more sequences of primitives, respective data structures storing data to be used when rendering the respective set of primitives to which the data structure relates, wherein a respective data structure for a given set of primitives comprises one or more sequences of commands, each sequence of commands corresponding to a respective one of the sequences of primitives being processed, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein a particular type of state command is operable and configured to variably store different types of state data relating to a certain set of properties that can be selectively enabled for a given sequence of primitives based on which of those properties are enabled for the sequence of primitives to which that state data relates.

In embodiments, the encoder (circuit) is thus further configured to:

determine, based on which one or more properties of the certain set of properties that can be selectively enabled for a given sequence of primitives are enabled for the sequence of primitives, a respective command format for such particular type of state command that is to be used for the sequence of commands corresponding to that sequence of primitives.

Another embodiment of the technology described herein comprises a method of processing (e.g. decoding) data for use by a graphics processor when generating a render output, the method comprising:

obtaining, for a set of primitives, a respective data structure storing data to be used when rendering the respective set of primitives to which the data structure relates, the respective data structure comprising one or more sequences of commands, each sequence of commands corresponding to a respective sequence of primitives to be processed, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein a particular type of state command is operable
and configured to variably store different types of state
data relating to a certain set of properties that can be
selectively enabled for a given sequence of primitives
based on which of those properties are enabled for the
sequence of primitives to which that state data relates,
the method thus further comprising:
determining a respective command format for such par-
ticular type of state command that is to be used for a
respective sequence of primitives for which a corresponding sequence of commands is included into the
data structure; and
when decoding the corresponding sequence of commands
for the sequence of primitives, in response to encoun-
tering such particular type of state command, decoding
that particular type of state command according to the
determined command format for that sequence of
primitives.
Yet another embodiment of the technology described
herein comprises a decoder (circuit) that is operable and
configured to:
obtain, for a set of primitives, a respective data structure
storing data to be used when rendering the respective
set of primitives to which the data structure relates,
the respective data structure comprising one or more
sequences of commands, each sequence of commands
corresponding to a respective sequence of primitives to
be processed, and each sequence of commands includ-
ing a respective set of primitive type commands for
storing data identifying individual primitives that are to
be rendered for the region of the render output to which
the data structure relates and further including one or
more state type commands for storing state data asso-
ciated with respective processing operations to be per-
formed when rendering those primitives,
wherein a particular type of state command is operable
and configured to variably store different types of state
data relating to a certain set of properties that can be
selectively enabled for a given sequence of primitives
based on which of those properties are enabled for the
sequence of primitives to which that state data relates,
the decoder (circuit) that is operable and configured to
thus configured to:
determine a respective command format for such particu-
lar type of state command that is to be used for a
respective sequence of primitives for which a corre-
sponding sequence of commands is included into the
data structure; and
when decoding a corresponding sequence of commands
for the sequence of primitives, in response to encountering such particular type of state command, decoding
that particular type of state command according to the
determined command format for that sequence of
primitives.
It will be appreciated that these further embodiments of
the technology described herein relating to the encoding and
decoding side operations may, and in embodiments do, also
contain any or all optional features of the technology
described herein described herein.
Thus, it will be appreciated that these encoding/decoding
operations may be performed as part of the wider graphics
processing system/methods described above, e.g., such that
the data structures are produced during a first, geometry
sorting pass, and are then used during a subsequent second,
rendering pass.
Thus, the sets of primitives for which the data structures
are produced (or obtained) may, and in embodiments do, correspond to the primitives that are to be rendered for a
respective region of the render output to which the data
structure relates. In that respect, as described above, the
respective region may be a region into which the render
output has been sub-divided for sorting purposes, but could
also, e.g., correspond to a bounding box generated for the set
of primitives.
Other arrangements would be possible though and the sets
of primitives may correspond to any suitable sets of primi-
tives that may need to be processed by a graphics processor
independently of any particular sorting operation that may
have been performed. That is, there may be other graphics
processing contexts in which it is desired to process primi-
tive data in this way, and these further embodiments of the
technology described herein are intended to cover any such
applications.
Similarly, whilst the encoding/decoding operations may
be performed by respective circuits (units) within the graph-
ics processor, e.g. as part of the wider graphics processing
system/methods described above, the encoding/decoding
operations according to these further embodiments could
also be performed by separate and dedicated encoding/
decoding circuits (units).
As mentioned above, the technology described herein
relates particularly to certain types of state data relating to
properties that can be selectively enabled for a particular
sequence of primitives.
In this respect, the sequence of primitives may be any
suitable sequence of primitives for which such properties
can be selectively enabled. For example, the sequence of
primitives may, e.g., be, and in embodiments is, a single
draw call, but could also be a group of multiple draw calls.
The sequence of primitives could also correspond to a
sub-draw call sequence of primitives, such as a "packet" or
group of primitives for which processing is performed.
The selective enabling of the properties for the sequence
of primitives may be done in any suitable and desired
manner, e.g. depending on the graphics processing system
(and sequence of primitives) in question. For example, for
certain API features, this may be done by the application
programmer, with the driver/compiler then setting an appro-
priate flag or other indication to tell the graphics processor
which features are enabled (and hence control the rendering
operations performed by the graphics processor).
Various arrangements would be possible in this regard.
Subject to the particular requirements of the technology
described herein, the data structures and commands that are
used according to the technology described herein may take
any suitable and desired form.
For instance, a data structure produced in accordance with
the technology described herein will include a number of
primitive type commands storing primitive data identifying
the individual primitives, e.g. by reference to their associ-
ated vertex indices, that are to be included into the data
structure. This type of data is therefore necessarily stored on
a per-primitive basis.
These primitive type commands thus identify individual
primitives, e.g., and in embodiments, such that there is a
one-to-one correspondence between primitives and their
respective primitive commands. Thus, whenever it is deter-
mined that a primitive (i.e. the current primitive being
processed for a tiling operation) should be rendered for a
region (or regions) of the render output, a corresponding
primitive command storing the data identifying the primitive
in question is in embodiments generated for inclusion into a
respective primitive list for that region (or regions).

The primitive type commands that can be included within a data structure of the technology described herein may generally take any suitable and desired form. For example, in embodiments, there are plural different primitive type commands available, e.g. having different sizes (lengths). In this respect, the primitive type commands that are available may, e.g., and in embodiments do, correspond to the primitive type commands that are described in United States Patent Application Publication No. US 2023/0306660 (Arm Limited), the entire contents of which are incorporated herein by reference.

As mentioned above, in addition to the primitive type commands that store the data identifying the individual primitives themselves, a data structure according to the format of the technology described herein can (and does) include further types of commands for storing other data relating to the primitives, i.e. 'state data' identifying processing operations or parameters that are to be used when rendering the primitives (broadly, primitive metadata).

This type of 'state data' generally describes the primitives, or groups of primitives, and so such state data is in embodiments stored in association with the respective primitive(s) to which it applies. Thus, an item of state data may apply to individual primitives, but may also, and typically will, apply to sets of plural primitives, as it is often the case that a set of plural primitives will share the same state and/or configuration data.

Thus, a state type command may be included in the sequence of commands for a primitive list before (e.g., and in embodiments, immediately before) the start of a set of one or more primitive commands identifying the primitives to which the state data indicated by the command applies. If the state data is constant for a set of plural primitives, or at least changes in a predictable (and expected) way, there is no need to store (the same) state data for each of the primitives (primitive commands) in the set of primitives, and in embodiments therefore this is not done. Instead, a sequence of one or more dedicated state type commands is included into the sequence of commands which sequence of state type commands applies to the following set of one or more primitives as a whole.

Thus, when a new primitive is to be included into a primitive list, a primitive type command for the primitive is then generated for inclusion into the sequence of commands for the primitive list. At the same time, a set of one or more state type commands may be generated for storing any state data that applies to that primitive. The set of state type commands can then be included into the primitive list in association with the primitive command to which it relates, e.g., and in embodiments, immediately before the primitive command in the sequence of commands for the primitive list. The next primitive is then identified and a suitable primitive command for that primitive generated for inclusion. If the state data has changed between the two primitives, a further state type command (or set of state type commands) is in embodiments also included in association with the next primitive command (and so on). On the other hand, if the state data for the new primitives has not changed relative to the previous value (or, relative to some default value, depending on how the state data is represented), there is no need to add another state type command (and this is therefore not done).

Separating out state data from primitive data in this way can then allow for improved, e.g. more efficient, storing of such data, with greater flexibility in how, and when, each different type of data is included.

As discussed above, the technology described herein particularly provides an improved (variable) encoding of certain types of state data, e.g., and in particular, state data that relates to certain properties that can be selectively enabled (or not) for particular sequences of primitives. Examples of this type of state data may include a variable shading rate, a layer index and/or a viewport index, as discussed above.

In embodiments, a (single) same particular state type command is operable and configured to store any (and all) of these different types of data, and this is in embodiments done, as described above, in a variable manner, so that depending on which properties are enabled (and hence which types of state data potentially need to be stored) for a given sequence of primitives for which a corresponding sequence of commands is included into a data structure, different command formats are used.

For example, depending on which (combinations of) properties from the certain set of properties are enabled (or not), different command formats are used, which different command formats may, e.g., differ in terms of the command size ((bit) length), the command layout (i.e. which state data is stored in which bit positions), and the (maximum) number of times that command can be repeated.

Thus, each of the possible combinations of properties being enabled or not enabled may have a corresponding command format that should be used in that case, and the graphics processor when encoding data that is to be stored using this particular (variable) state type command should accordingly determine, i.e. select from the available command formats, the appropriate command format to be used for a (and each) sequence of primitives for which a corresponding sequence of commands is to be included into a respective data structure.

Thus, during the first, geometry sorting pass, the processing of the sequences of primitives to produce the respective data structures according to the technology described herein in embodiments comprises:

for a sequence of primitives for which a corresponding sequence of commands is to be included into a respective data structure:

determining, based on which one or more properties of the certain set of properties that can be selectively enabled for a given sequence of primitives are enabled for the sequence of primitives, a respective command format for such particular type of state command that is to be used for the sequence of commands corresponding to that sequence of primitives.

Thus, in embodiments there is a (finite/limited) set of different available command formats that can be used for the particular type of state command depending on which properties of the certain set of properties that can be selectively enabled for a given sequence of primitives are enabled, with each (combination of) enabled properties in the certain set of properties having a respective command format that should be used. In embodiments, each (combination of) enabled properties has a different command format, wherein the different command formats differ in terms of one or more of: (i) command size ((bit) length); (ii) command layout; and (iii) maximum number of commands that can be repeated. Determining a respective command format thus in embodiments comprises selecting the appropriate command format from the set of different available command formats.

An indication of the determined command format for that sequence of primitives should then be, and in embodiments is, included into the data structure in association with the sequence of commands corresponding to that sequence of primitives, such that when that sequence of commands is subsequently decoded, i.e. during the second, rendering pass, the data can be decoded appropriately according to the particular command format that was used to encode it.

Thus, in embodiments, the encoding side operation further comprises including into the data structure in association with the sequence of commands, an indicator of the command format for such particular type of state command that is to be used for that sequence of commands. This indicator may for example be included into a suitable configuration command to indicate the command format to be used for a following sequence of commands.

This indicator could directly indicate the command format to be used (i.e. by indicating the respective command format (index) from the set of available command formats). Alternatively, this could be indicated in other ways. For example, the indicator could indicate which properties are enabled (or not) (as this information may be needed for other purposes), and this information could then be used to re-determine the command format that should be used.

Various arrangements would be possible in this regard.

Whilst described above in relation to a single sequence of primitives (i.e. a single draw call/packet), it will be appreciated that a data structure may generally contain sequences of commands corresponding to multiple sequences of primitives. Each sequence of primitives could potentially use a different command format. Thus, a respective indicator is in embodiments provided in association with each sequence of commands. This is not strictly necessary however and an indicator could for instance be provided only when the command format has changed between sequences of commands, otherwise the same command format will be used.

Once the appropriate command format has been determined, the encoding then continues by including appropriate commands for storing the relevant data.

Thus, if there is state data that needs to be stored relating to any of the certain set of properties that can be selectively enabled for a given sequence of primitives, i.e. state data according to any of the types of state data that the particular (variable) state type command according to the technology described herein is operable and configured to store, at least one of that particular (variable) state type command should then be (and is) included into the data structure accordingly for storing the desired state data according to the determined command format.

Thus, in embodiments, when state data corresponding to one or more of the different types of state data relating to the certain set of properties that can be selectively enabled for a given sequence of primitives is to be included into the data structure: at least one of that particular type of state command is included into the data structure for storing the state data according to the determined format.

Correspondingly, when decoding such commands, this is done based on the information of the determined command format.

The technology described herein thus provides a novel encoding of these types of state data that, at least in typical graphics processing workloads, is expected to provide an improved, i.e. more efficient, encoding.

There may of course be other types of state data that do not relate to any properties in the certain set of properties for which state data is stored using the particular type of state command (the meta command) described above, but may desirably also be included into a data structure produced according to the technology described herein. These types of state data may or may not relate to optional properties.

Thus, the set of available command types may include various other types of state command for storing any other state data, as desired. For example, there may be other state type commands for storing any one or more of: (i) a timestamp (indicating a value of a timestamp for a primitive); (ii) a tile coverage mask (indicating the primitive tile coverage, i.e. whether or not the primitive covers all four quadrants of a tile); and (iii) a primitive identifier value (indicating the primitive identifier).

These other state type commands may generally have any suitable form. For example, in embodiments, separate dedicated commands are used for storing each of the timestamp, tile coverage mask and primitive identifier values, but other arrangements would of course be possible. For instance, the primitive identifier for at least the first primitive in a given sequence of primitives could be encoded using the particular (variable) state type commands of the technology described herein.

Another example of state data that may desirably be stored in association with a set of primitives would be a (primitive) point size or line width. Again, the point size/line width may typically be set for different sequences of primitives, and so the point size/line width value could be stored either using a dedicated state type command or encoded using the particular (variable) state type commands of the technology described herein. In some embodiments, therefore, the point size/line width is encoded using the particular (variable) state type commands of the technology described herein (and this may be stored in combination with any or all of the variable shading rate, layer index or viewport index, e.g. as discussed above).

Various other arrangements would of course be possible.

In embodiments, to reduce the size of the commands, the state commands (including the particular (variable) state type commands according to the technology described herein) encode changes (differences) in state.

That is, the state data is in embodiments encoded and stored as a difference compared to another value. The changes in state can be encoded in any suitable manner. For example, a state data command may indicate changes in state relative to the previous primitive command. Thus, in that case, if no new state data command is sent for the current primitive, the current primitive uses the state data for the previous primitive. Alternatively, a state data command may indicate changes in state relative to a default or expected value. In that case, if no new state data command is sent, a default or expected value may be used.

Other arrangements would of course be possible, e.g. depending on the state data in question.

As alluded to above, there may be other types of data, such as configuration data, that may also need to be encoded. For instance, configuration data typically applies to greater numbers of primitives, e.g. all of the primitives within a draw call, or even within the entire render output. Thus, a sequence of primitives (e.g. relating to a set of one or more draw calls) included for a primitive list may start with a sequence of configuration data that is to be applied to all of the primitives within the sequence of primitives. Some examples of configuration data may include one or more of: (i) a depth range; (ii) a scissor box (to be used when scissoring operations are to be performed); (iii) a draw call descriptor or identifier; and (iv) an indicator of a pipeline or occlusion query to be performed (e.g. a query to determine if a group of primitives is visible or not, and hence how far along the rendering pipeline the primitives should be processed).

This type of configuration data can thus be stored using suitable 'configuration type' commands (which 'configuration type' commands may generally have any suitable and desired format, including the formats described in in United States Patent Application Publication No. US 2023/0306660 (Arm Limited), the entire contents of which are incorporated herein by reference).

As mentioned above, the configuration data for a sequence of commands (i.e. primitives) may also, and in embodiments does, indicate the command format to be used for the particular type of (variable) state commands in respect of that sequence of commands (i.e. corresponding to a given sequence of primitives). Thus, this information can also be indicated using a suitable configuration type command.

Other arrangements would however be possible. For example, depending on the graphics processing system in question, this information could be included into a suitable packet header, or other associated data structure, as desired, e.g. so long as the appropriate command format that is to be used for a given sequence of commands (i.e. corresponding to a given sequence of primitives) can suitably be identified by the graphics processor when decoding that sequence of commands.

Subject to the particular requirements of the technology described herein the graphics processing (and graphics processor) may otherwise comprise any suitable and desired features.

In the technology described herein, in embodiments, a render output (e.g. frame) is sub-divided into a plurality of regions for rendering. Each region corresponds to a respective area of the render output. This sub-division can be performed in any suitable manner, as desired. In embodiments, the regions are rectangles, e.g. squares, but other arrangements would be possible.

In that case, the data structures of the technology described herein may have any suitable correspondence with the regions into which the render output is sub-divided.

For example, in embodiments, the data structures correspond to primitive lists, and a respective primitive list may be prepared for each region, on a one-to-one basis. However, it may also be the case that a primitive list is prepared for a plurality of regions, or that multiple primitive lists are prepared that cover a single region. Various arrangements are possible in this regard and the technology described herein can be applied to any suitable primitive lists.

It would also be possible that the data structures correspond to respective (groups of) packets of primitives, e.g. associated with a particular bounding box. Various arrangements would be possible in this regard. Thus, a region for which a data structure is produced may correspond to the region that is covered by a bounding box (i.e. the region is defined dynamically based on the geometry rather than based on a static sub-division of the render output).

Whilst the technology described herein has been described above primarily in relation to preparing (commands for) a single data structure, for a respective region of the render output, it will be appreciated that the graphics processing system typically, and in embodiments, will prepare a plurality of data structures, e.g. so that all of the regions into which the render output is divided for the purposes of sorting the primitives (or more generally all of the sets of primitives for which a data structure is to be produced) have a corresponding one or more data structures. Thus, in embodiments, the steps described above are repeated in order to prepare a plurality of data structures.

Likewise, whilst the technology described herein is described above in relation to storing data for a sequence of primitives, it will be appreciated that a given render output may have multiple sequences of primitives defined for it, and in embodiments all of the primitive sequences are processed in the same way.

The description above focusses on the preparation of the data structures. The primitive lists that are generated in this way are in embodiments then written back to memory so that they can subsequently be fetched into a rendering pipeline of the graphics processor for rendering the scene (although other arrangements would of course be possible—for example, the primitive lists may be written out directly to local storage on the graphics processor for access by the rendering pipeline). Once the data structures have been generated and written out, the data structures can then be used, e.g. in the normal way, to generate the desired render output. For instance, once the primitives and their vertices have been defined, and the vertex data obtained, this vertex data can then be processed by a graphics processing system (graphics processor), in order, e.g. to display the desired render output. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes can use the primitive lists generated according to the technology described herein. Particularly, the system may read the data structures in order to determine which primitives need to be rendered for which tile (thus avoiding unnecessary processing for any primitives that do not appear in a particular tile).

So, the data structures generated according to the technology described herein may be passed into a graphics processing (rendering) pipeline, and used thereby in order to render a desired output. The graphics processing pipeline may contain any suitable and desired processing stages that a graphics processing pipeline may contain. In an embodiment, it includes, in embodiments in this order, one or more of, and in embodiments all of: a rasteriser; an early depth (or an early depth and stencil) tester; a renderer, in embodiments in the form of a fragment shader; a varyings position evaluation (interpolator) associated with the fragment shader; a late depth (or depth and stencil) tester; a blender; one or more tile buffers; and a tile write back unit.

Accordingly, the technology described herein also extends to graphics processing systems, and methods of graphics processing, that use the data structures prepared according to embodiments of the technology described herein.

When the data structures are used, they are in embodiments decoded, with the decoding in embodiments operating in reverse to the encoding described above. Thus, a suitable decoding circuit (e.g. a primitive list reader) is configured to read the sequence of commands for the data structure, identify the respective type of command, and then decode the stored information appropriately for use during the rendering process.

Although the above embodiment has been described with reference to using the data structures to indicate primitives to be rendered for the rendering process, it will be appreciated these data structures could also or instead be used for other purposes, such as to perform (e.g. initial) culling, and/or hidden surface removal, of graphics data and descriptors.

The technology described herein may generally find application in any suitable (e.g. tile-based rendering) graphics processing system.

The technology described herein can be used for all forms of output that a graphics processing pipeline may be used to generate, such as frames for display, render-to-texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in embodiments do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments will now be described in relation to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

The advantage of such tile-based rendering is that primitives that do not appear in a given tile do not have to be processed for that tile, and therefore can be ignored when the tile is processed. This can allow the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, for each sub-region (tile), a list of the primitives to be rendered for that sub-region (e.g. that will appear in the sub-region) may be prepared. Such a "primitive list" (which can also be referred to as a "tile-list") identifies (e.g. by reference to a primitive indicator) the primitives to be rendered for the tile (sub-region) in question.

The process of preparing primitive lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the primitive list for each tile that it falls within.) In effect, each sub-region (tile) can be considered to have a bin (the primitive list) into which any primitive that is found to fall within (i.e. intersect) the sub-region is placed (and, indeed, the process of sorting the primitives on a tile-by-tile basis in this manner is commonly referred to as "binning").

The process of determining the primitives that should be listed (rendered) for any given tile described above (the "binning" process) can be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the primitive list for each tile that it is found to fall within. Thus, taking the example shown in FIG. 1, the primitive 3 is added to the primitive list for tile 4, the primitive 5 is included in the primitive list for tiles 6 and 7, the primitive 8 is included in the primitive lists for tiles 9, 10, 11 and 12, and the primitive 13 is included in the primitive list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives (e.g. a "draw call"), and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the primitive lists.

Once lists of primitives to be rendered (primitive lists) have been prepared for each sub-region (tile) in this way, the (primitive) lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

Figure 2:
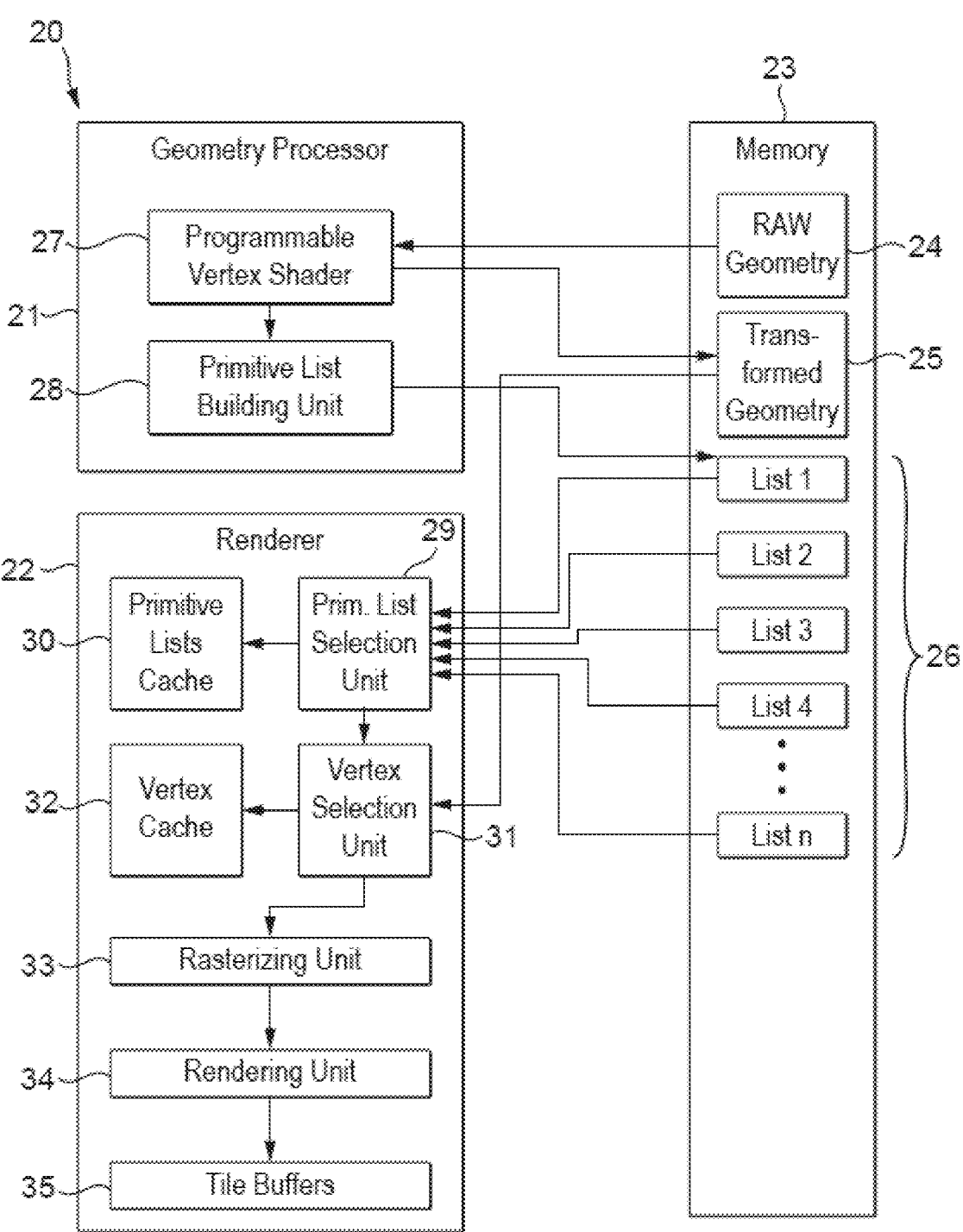
FIG. 2 shows schematically an arrangement of a graphics processing system that can be operated in accordance with the technology described herein.

FIG. 2 shows schematically a graphics processor 20 that may be operated in accordance with the technology described herein. The graphics processor 20 includes a geometry processor 21, and a renderer 22, both of which can access a memory 23. The memory 23 may be "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of primitive lists 26. The primitive lists 26 are prepared in accordance with the technology described herein. This process will be described in more detail below.

The transformed geometry data 25 comprises, for example, transformed vertices (vertex data), etc.

The geometry processor 21 comprises, inter alia, a programmable vertex shader 27, and a primitive list building unit 28. The programmable vertex shader 27 takes as its input the raw geometry data 24 stored in the memory 23, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes.

The primitive list building unit 28 carries out the tiling and primitive list preparation processes of the technology described herein of allocating the primitives to the primitive lists which are then used by the renderer 22 to identify the primitives that should be rendered for each sub-region of the scene to be rendered (and includes suitable circuitry for doing this). To do this, the primitive list building unit 28 takes as its input the transformed and processed vertex data from the programmable vertex shader 27 (i.e. the positions of the graphics object in the scene), builds primitive lists using that data, and stores those lists as the primitive lists 26 in the memory 23.

The renderer 22 includes a primitive list selection unit 29, a primitive list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The primitive list selection unit 29 of the renderer 22 determines which draw call, and hence which primitive, is to be rendered next. It does this by considering the primitive lists 26 stored in the memory 23, and selecting from one of those lists the next graphics object (e.g. primitive, or draw call) to be rendered.

The primitive list selection unit 29 can also place one or more primitive lists in the primitive list cache 30.

The primitive list selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

Figure 3:
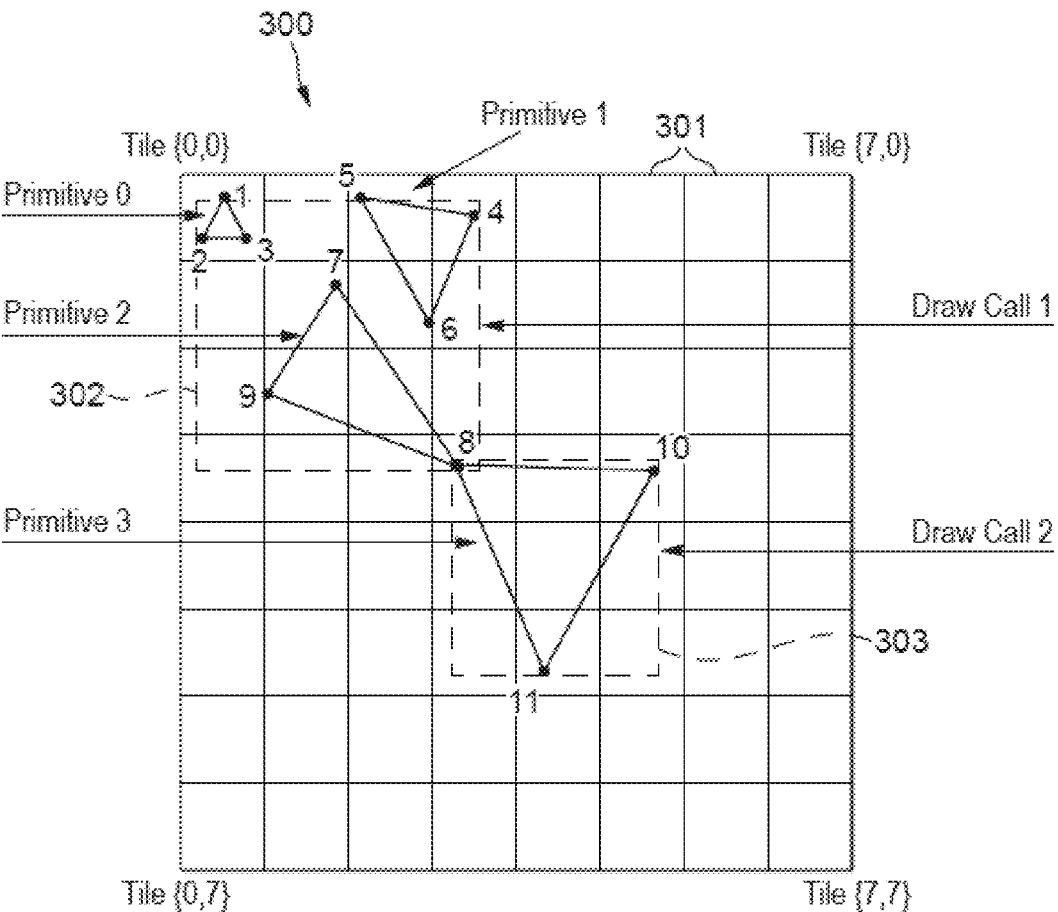
FIG. 3 shows an example scene of primitives to be displayed.

Often, the primitives will be grouped into "draw calls", which basically means that the application programmer wants all the primitives in the draw call to be drawn in one go, typically for performance reasons. For example, FIG. 3 shows an exemplary scene to be displayed that will be used as the exemplary scene for display in which the scene 300 contains four primitives, which are grouped into two "draw calls", draw call 1 and draw call 2. As shown in FIG. 3, primitives 0, 1 and 2 are grouped as draw call 1, and primitive 3 belongs to draw call 2. Primitive groups in the same draw call typically share the same state and shader programs data.

It should also be noted here that in view of the fact that there are two separate draw calls, with primitive 2 in one and primitive 3 in the other, the vertex 8 shown in FIG. 3 cannot be shared between primitive 2 and primitive 3, but instead is represented when the vertices are defined for the different draw calls as two different vertices, with the same vertex location and vertex attributes.

As shown in FIG. 3, and as discussed above, the scene 300 to be rendered is divided into plural individual sub-regions or tiles 301.

As will be appreciated by those skilled in the art, in practice any given scene to be rendered will typically comprise many more primitives and draw calls than the four primitives and two draw calls shown in FIG. 3. However, FIG. 3 shows four primitives and two draw calls only for simplicity and clarity purposes.

The primitive list building unit 28 when carrying out the tiling and primitive list preparation processes of the technology described herein of allocating the primitives to the primitive lists which are then used by the renderer 22 to identify the primitives that should be rendered for each sub-region of the scene to be rendered may do this either for individual primitives (within draw calls), or for entire draw calls.

That is, in embodiments, the primitive list building unit 28 may determine the location of the primitives within each draw call, and list those primitives (for those draw calls) in a primitive list for each tile which the primitive falls within.

In other embodiments, however, the primitive list building unit 28 may determine the location of each draw call, Draw Call 1 and Draw call 2, and lists the draw calls (and all of the primitives within those draw calls) in a primitive list for each tile which the draw call falls within.

Further, as discussed above, this sorting could be done using, e.g., an exact binning technique, in which case the primitive list building unit 28 uses the determined transformed vertex positions it is provided with for a given primitive or draw call by the programmable vertex shader 27 to identify which sub-regions and sets of sub-regions the primitive or draw call falls within (intersects). However, as will be appreciated by those skilled in the art, other techniques for determining and locating the primitives and/or draw calls within the scene and in relation to the sub-regions (tiles) 301 could be used if desired. For example, as also mentioned above, bounding box techniques could equally be used. (Where a bounding box technique is used, it is often desirable for the bounding box to be generated as part of the primitive list building process, e.g., by the primitive list building unit, but other arrangements would, of course, be possible.) Thus, FIG. 3 shows exemplary bounding boxes 302, 303 for the draw calls, Draw call 1 and Draw Call 2, and so the sorting in FIG. 3 is performed on a relatively less precise, per-draw call basis.

Various arrangements would be possible in this regard, e.g. depending on the desired precision with which the geometry is to be sorted.

This sorting process, however it is performed, is repeated by the primitive list building unit 28 for each and every draw call in the scene to be rendered in turn, until complete primitive lists 26 have been generated for each tile that the scene to be rendered is divided into.

The primitive list building unit 28 in the present embodiment places the primitives in the primitive lists 26 in the order that it receives the primitives (i.e. or the associated draw calls including those primitives) from the programmable vertex shader 27. This means that, so far as each individual primitive list 26 is concerned, the primitives are listed according to the desired order of rendering the primitives for that tile.

As discussed above, the renderer 22 also includes a primitive list cache 30 and a vertex data cache 32. These caches may comprise local memory provided on the renderer 22 that can be more rapidly accessed by processing units of the renderer (and in particular the primitive list selection unit 29 and vertex selection unit 31, respectively) than the main memory 23.

The primitive list selection unit 29 is configured to store in the primitive list cache 30 one or more primitive lists 26 that it has read from the main memory 23.

The vertex selection unit 31 can similarly cache vertex data that it retrieves from the transformed geometry data 25 in the memory 23 in the vertex data cache 32, again in particular where it can be identified that the vertex data will be required for a primitive again.

The technology described herein relates to the generation of the primitive lists 26 by the primitive list building unit 28, and in particular to the format in which data is encoded into the primitives lists 26 for use by the renderer 22.

According to the new primitive list format of the technology described herein, there are multiple, separately identifiable types of command that can be used to store respective different types of data, as will be explained further below.

In particular, it is recognised that the data that may desirably be stored within a primitive list 26 can be grouped into different types of data, based on the associated lifetime of the data within the rendering process, and that it may be better to store the different types of data, separately, using different respective types of commands.

In particular, as shown in FIG. 4, the commands defined for the primitive list format of the present embodiment can be grouped into three main, different types of commands:

(i) primitive type commands ('prim');

(ii) state type commands ('state' (or 'meta')); and (iii) configuration type commands ('cfg').

The formats and purpose of these different types of commands will be explained further below.

Within each of these main types of commands, there may be further (sub-) types, such as different types of primitive commands, different types of state commands, etc., as is also shown in FIG. 4. Each of the different commands is identifiable by a respective operating code (opcode) (as stored in the identifier (ID) field, shown on the left hand side of FIG. 4).

Whilst FIG. 4 summarises a particular set of commands that are available to be used according to one primitive list format according to an embodiment of the technology described herein, it will be appreciated that there may be various other commands that can be included into primitive lists in embodiments (and correspondingly not all of the command shown in FIG. 4 need to be used (or usable) for a primitive list in accordance with the technology described herein).

Thus, it will be understood that FIG. 4 is just showing one possible example of a primitive list format according to an embodiment of the technology described herein, but other arrangements would of course be possible.

The primitive commands (type='prim' in FIG. 4) are dedicated for storing actual primitive data identifying the individual primitives that are to be encoded into the primitive list. In particular, a primitive command stores a set of primitive vertex index values defining a respective primitive. The vertex index values are stored in a compressed form, as difference or delta values, as will be explained further below.

In the FIG. 4 example, there are three different primitive type commands, which differ primarily in terms of their size, i.e. how many bits are available for storing the vertex index (delta) values. In particular, in the present example, three types of primitive command are available, respectively 'prim8' (which is an 8-bit command), 'prim16' (a 16-bit command), and 'prim32' (a 32-bit command).

In the present embodiment, the primitive list format also includes two configuration commands, respectively 'cfg0' and 'cfg1', for storing configuration type data that applies to larger groups of plural primitives (e.g. a draw call, or plural draw calls). These commands are used to start respective configuration sequences.

The state (or meta) commands are used to encode metadata representing processing operations or parameters that should be used when rendering individual primitives. This data is therefore associated with the primitives and so may vary on a per-primitive basis. However, this data may also be shared between primitives, or at least may vary in a predicable manner, such that it does not always need to be encoded between primitives.

In the present embodiments, at least some types of state data are encoded using dedicated state commands, having their own respective (unique) opcode.

For example, this is the case in the present embodiments for timestamp data, for which a dedicated timestamp command (ts8) is provided that is usable to encode delta compressed value of the timestamp.

This is also the case for the tile coverage map for which a dedicated coverage command (cvg8) is provided that is usable to encode the tile coverage for the primitive (or set of primitives) associated with the command.

Similarly, respective, dedicated 'short' and 'full' primitive identifier commands are provided that can respectively be used to encode either the delta value of the primitive identifier as compared with the previous primitive in a bin (the 'short primitive id' (pid8) command) or the full absolute value of the primitive identifier (the 'full primitive id' (pid32) command).

In this respect, it will be appreciated that the formats of the primitive commands, the configuration commands and the particular state commands described above may, e.g., and in the present embodiments do, generally correspond to the format of the corresponding commands that are described in United States Patent Application Publication No. US 2023/0306660 (Arm Limited), the entire contents of which is incorporated herein by reference.

According to the present embodiments, there is further provided a "variable state" command, respectively the 'meta0' command indicated in FIG. 4, that is operable to variably store state data relating to a variable shading rate, a layer index and a viewport index, depending on whether or not these (optional) properties (attributes) are enabled, e.g., for the draw call that is currently being processed.

That is, rather than providing separate dedicated commands for storing each of the variable shading rate, layer index and viewport index, as might otherwise be contemplated, in the present embodiments a single (same) particular type of command (the 'meta0' command) is provided that can be used to store any (or all) of the variable shading rate, layer index and viewport index, and the format of this command is variable such that it can be configured, e.g. on a per draw call basis, according to which of these properties (attributes) are enabled for the draw call in question.

An example of the variable command format for such particular type of command (the 'meta0' command) is shown in the table in FIG. 5. Thus, as shown in the table in FIG. 5, depending on which attributes are enabled for the current draw call (i.e. depending on which of the particular API features are enabled), the same command (i.e. the 'meta0' command that is identified by the respective same opcode code 'op_2', as shown in FIG. 4) may have different command formats.

In particular, depending on which properties (attributes) are enabled, the same command has a number of different command formats, e.g., that may differ in terms of the command length (which is defined in FIG. 5 in terms of a number of bits), the command layout according to which the state data is stored in a single one of the 'meta0' commands, and the maximum number of commands that can be repeated.

Thus, in the example shown in the table in FIG. 5, if only variable rate shading is enabled (but layer and/or viewport transforms are not enabled), the command format corresponds to that shown in the first entry in the table in FIG. 5, in which the variable shading rate is encoded using a single 8-bit command, with a first portion of the command including a 4-bit opcode (i.e. 'op_2') identifying that the command is a variable (i.e. 'meta0') command and a second portion of the command storing the value for the variable shading rate. Other command formats are accordingly used for other (combinations of) properties (attributes) being enabled. Thus, as shown in FIG. 5, the same 'meta0' command type, i.e. having the same opcode ('op_2'), can, and does, have different command formats depending on which properties (attributes) are enabled.

This then allows for the command formats to be selected for the particular state data that may need to be encoded, which is therefore more efficient than simply trying to always packet all of the variable shading rate, layer index and viewport index into a single fixed format command (whilst also avoiding having to provide separate dedicated commands for storing each of the variable shading rate, layer index and viewport index, which would require additional opcodes to be reserved).

In this respect, it will be appreciated the table in FIG. 5 thus shows an example of the possible command formats for a single 'meta0' command according to different (combinations of) properties (attributes) being enabled but other examples would of course be possible.

For example, in the example shown in FIG. 5, the 'meta0' command is an 8-bit command except in the case that all three properties (attributes) are enabled at the same time. This then means that in order to encode the full range of some of the items of state data, multiple 'meta0' commands may need to be repeated. For instance, as shown in the table in FIG. 5, two 8-bit 'meta' commands may be needed to encode the full range of the (absolute) layer index (which is typically an 8-bit value), with the first 'meta0' command storing the first 4 bits of the layer index (i.e. bits [3:0]) and the second 'meta0' command storing the last 4 bits of the layer index (i.e. bits [7:4]). Thus, as shown in the table in FIG. 5, in the case that the following properties (attributes) are enabled/not enabled:

vrs_rate=no, layer_index=yes, viewport_index=no in order to store the full (8-bit) range of the (absolute) layer index, two 'meta0' commands may be included into the sequence of commands, with the following layout:

op_2, layer_index(bits[3:0]);

op_2, layer_index(bits[7:4]).

As another example, as also shown in the table in FIG. 5, in the case that the following properties (attributes) are enabled/not enabled:

vrs_rate=no, layer_index=yes, viewport_index=yes in order to store the full (8-bit) range of the (absolute) layer index and the full (4-bit) range of the viewport index, four 'meta0' commands may be included into the sequence of commands, with the following layout:

op_2, layer_index(bits[1:0]), viewport_index(bits[1:0]);

op_2, layer_index(bits[3:2]), viewport_index(bits[3:2]);

op_2, layer_index(bits[5:4]), NULL(2 bits);

op_2, layer_index(bits[7:6]), NULL(2 bits).

In this example, because the full (4-bit) range of the viewport index can be stored using the first two commands, the third and fourth commands (that are needed to store the full (8-bit) range of the (absolute) layer index) store NULL data in the portion of the command that would otherwise be usable to store the viewport index.

Thus, in this case there is some unused space in the third and fourth commands. However, in this respect, the present Applicants recognise that in typical graphics processing use cases most of the time the layer index and viewport index will not both need to be stored for a particular draw call, and so it is expected to be more efficient to provide a single same command format that can variably store either or both of these, as needed (e.g. rather than having separate dedicated commands for each of these properties, requiring separate opcodes to be reserved for each of these commands).

FIG. 5 similarly shows various other command layouts (both for single 'meta0' commands and for the case where multiple 'meta0' commands are repeated) for the other possible properties (attributes) being enabled/not enabled.

The example shown in the table in FIG. 5 has been found to be particularly efficient for typical graphics processing uses cases. However, the table in FIG. 5 is of course just one example and in general the particular command sizes and layouts that are used for the different combinations of attributes being enabled/not-enabled may generally be set or selected in any suitable manner as desired.

For instance, in other examples, the 'meta0' command could also be extended to 16 bits even when (only) two properties (attributes) are enabled, and this may in some cases be efficient.

In this regard, the respective layouts that are used, and which properties (attributes) are combined together can be (and in the present embodiments is) selected based on the expected frequency of use in typical graphics processing applications. For example, in FIG. 5, the 'meta0' command is operable to store any of variable shading rate, layer index and viewport index, but in general such variable commands could be used to store any desired state data. As a particular example, it may be desirable to also, or alternatively, be able to store primitive identifier or primitive point size/line width using such variable command formats. Various other examples would of course be possible.

Thus, FIG. 5 shows one example variable 'meta0' command format that has been found to be particularly efficient for typical graphics processing use cases, e.g. where it is expected that most of the time only zero or one of the properties (attributes) will be enabled per-draw call. Other arrangements would however of course be possible, e.g., and in particular, depending on the particular properties (attributes) and the graphics processing system in question. Indeed, an effect and benefit of the variable 'meta0' command according to the present embodiments is that the same command can use any different command formats for the different combinations of properties (attributes) being enabled, to try to make most efficient use of the available commands based on the frequency at which the properties (attributes) are expected to be used in a desired graphics processing application.

It will be appreciated that which properties (attributes) are enabled for a given draw call will typically be set by the application programmer. A driver for the graphics processor can then set, on this basis, a suitable flag or other indicator to indicate to the graphics processor which properties (attributes) are enabled.

This information as to which properties (attributes) are enabled can then be (and is) used when encoding the primitives lists (and correspondingly is also used when decoding the primitive lists), as will be explained further below.

Figure 6:
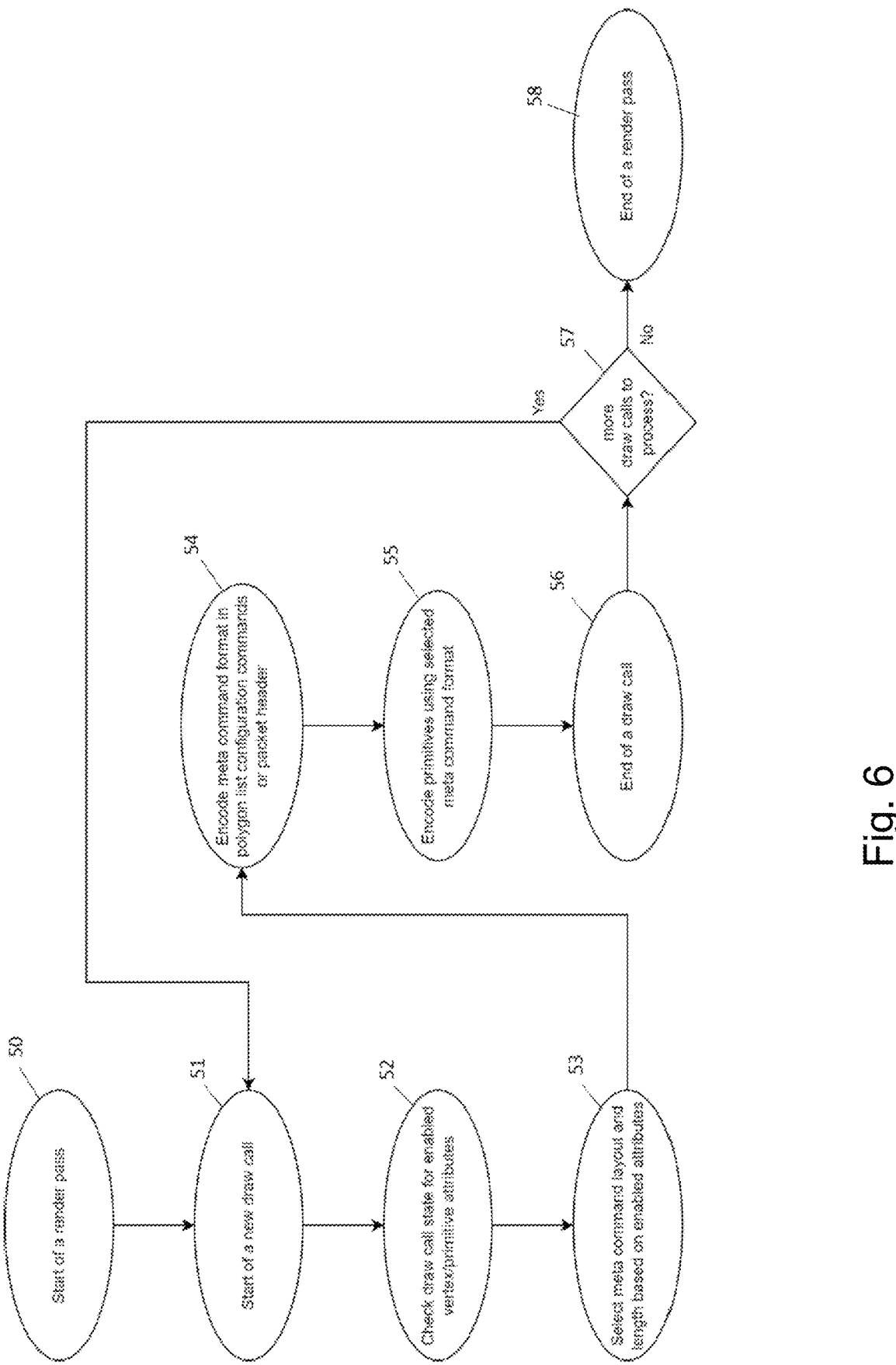
FIG. 6 is a flowchart showing an example encoding scheme that can be used for certain types of state data according to embodiments of the technology described herein.

FIG. 6 is a flow chart showing the encoding operation according to the present embodiments when producing a set of primitive lists for a respective set of draw calls for a particular render pass, i.e. corresponding to the first, geometry sorting pass described above.

Thus, the render pass is started (step 50), and a first draw call for the render pass is issued for processing (step 51). The graphics processor then checks the draw call state to see which features (attributes) are enabled for the current draw call (step 52). Based on which features (attributes) are enabled, the appropriate command format for the variable 'meta0' commands is then selected (step 53), e.g. according to the different possible command formats shown in FIG. 5.

An indication of the selected command format is then encoded into the respective primitive list being produced using a suitable configuration command (step 54). The primitives within that draw call are then encoded into the primitive list (data structure) appropriately, by including suitable commands.

As part of this, when it is desired to encode state data relating to any of the types of state data that the variable 'meta0' command is configured to store, i.e. the variable shading rate, layer index and viewport index (depending on which of these features (attributes) are enabled), the encoding adds a suitable 'meta0' command (or multiple such commands, as needed) to encode that state data according to the selected command format (i.e. the command format selected at step 53 and encoded at the top of the primitive list/data structure at step 54) (step 55).

Once all primitives in the draw call have been processed and encoded into the appropriate primitive lists/data structures (step 56), if there are further draw calls to be processed (step 57—yes), this process is repeated, with a new command format for the variable 'meta0' commands potentially being selected for the new draw call depending on which features (attributes) are enabled for the new draw call.

Once all of the draw calls have been processed (step 57—no), the render pass is finished (step 58).

The primitive lists/data structures can then be written out, e.g. for use during a subsequent render pass that performs the actual rendering of the tiles, e.g. in the normal manner for using such primitive lists/data structures.

Because in the present embodiments the 'meta0' commands have a variable format, when the primitive lists/data structures are read during the rendering pass, the graphics processor will need to decode the 'meta0' commands appropriately based on the particular command format that was used, i.e. based on which features (attributes) are enabled for the draw call that is currently being processed.

Figure 7:
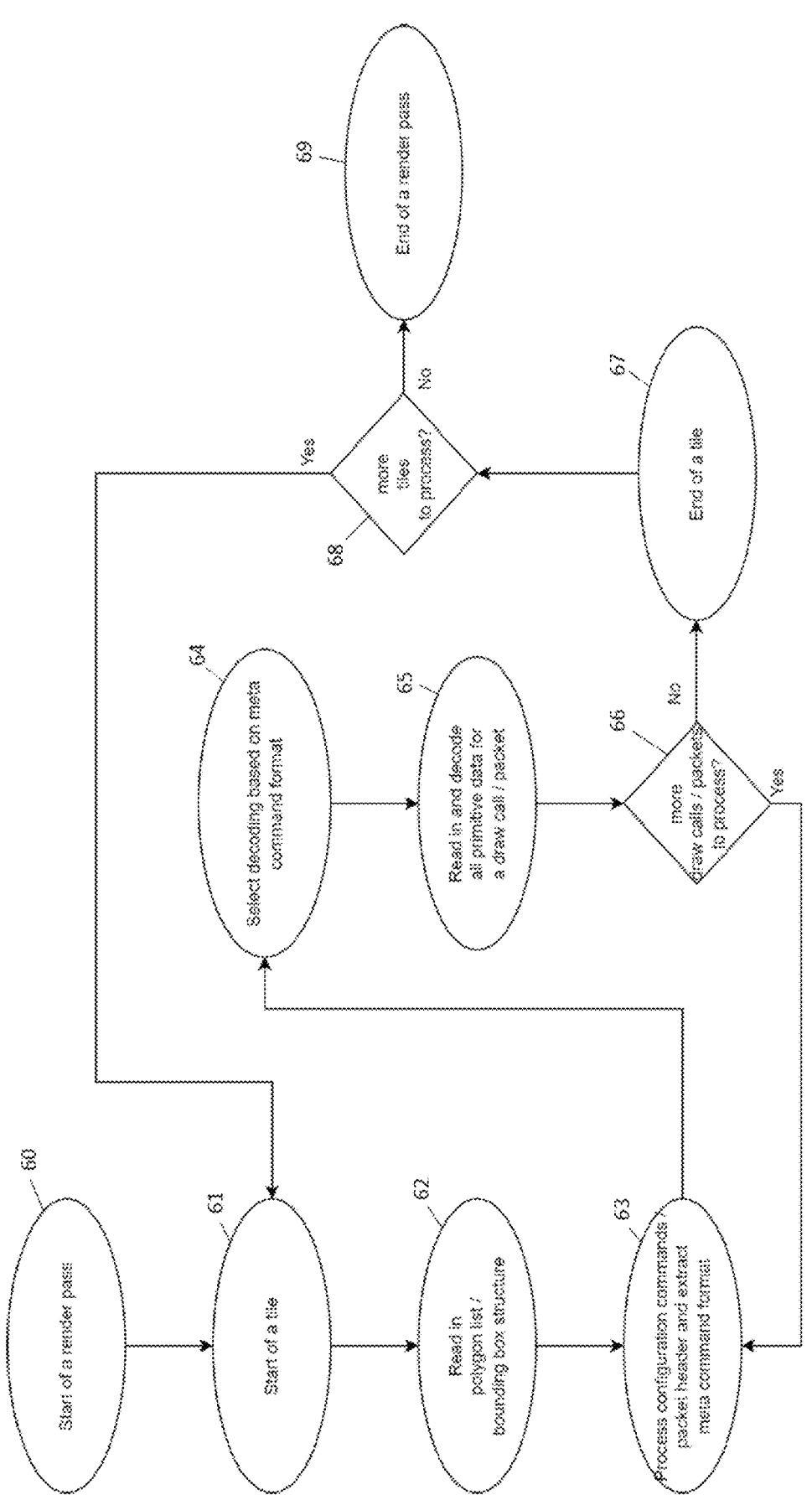
FIG. 7 is a flowchart showing a corresponding decoding scheme that can be used for certain types of state data according to embodiments of the technology described herein.

FIG. 7 is a flow chart showing the corresponding decoding operation according to the present embodiments during a subsequent render pass, i.e. corresponding to the second, rendering pass described above.

As shown in FIG. 7, a render pass is started (step 60), and a first tile is issued for rendering (step 61). The graphics processor then reads in the primitive lists associated with that tile (step 62) and starts processing the commands that are included in those primitive lists.

As part of this, the graphics processor will first process any configuration commands at the top of the primitive lists (step 63) and will extract from this the particular command format that is used for the variable 'meta0' commands (i.e. the particular command format that was selected at step 53 in FIG. 6 and encoded into a suitable configuration command at step 54).

When a 'meta0' command is encountered, the decoding is then selected and performed based on the particular command format that is being used for the 'meta0' commands for the particular draw call to which the commands relate (step 64).

The graphics processor thus reads in and decodes all of the primitive and state data for the current draw call (step

65). If there are more draw calls to be processed (step 66—yes), this processing is then repeated until each of the draw calls that need to be rendered for the tile have been processed (step 66—no), and once this is done, the reading of the data for that tile is done (step 67). If there are more tiles to be processed (step 68—yes), this process is then repeated for all of the tiles until there are no further tiles to be processed (step 68—no), and the end of the render pass is reached (step 69).

Thus, as will be appreciated from the above, in the present embodiments, there is a single type of command, i.e. the 'meta0' command, that has a variable command format that can be used and interpreted differently depending on which certain API features are enabled. This can then provide various improvements, e.g. in terms of reducing the overall number of unique commands (and hence opcodes) that are needed, and may also facilitate the preparation of smaller primitive lists, which can thus be more efficiently stored and cached (e.g. in memory 26 and/or primitive list cache 30, as shown in FIG. 2).

In this respect, whilst various examples have been described above in relation to the preparation of primitive lists it will be appreciated that the technology described herein may also be applied to other data structures, such as bounding box structures, e.g. where the geometry is sorted into respective bounding boxes (each encompassing a group of primitives). Thus, any references to 'primitive lists' above may more generally be considered as relating to 'data structures' which may or may not correspond to traditional primitive lists.

For instance, referring to FIG. 6 and FIG. 7, rather than encoding the selected 'meta0' command format into a configuration command (in step 54 in FIG. 6), this could be encoded into a suitable packet header, for instance, where the data structure is being prepared in respect of a bounding box encompassing a packet of primitives. Similarly, in FIG. 7, rather than reading in one or more primitive lists for a given tile and then processing the configuration commands included therein, before processing each of the draw calls to be processed for that tile, the graphics processor may (in step 62) read in the relevant bounding box structures and then process (in step 63) a suitable packet header to obtain the selected 'meta0' command format to be used for a respective packet, and then decode that packet accordingly (in step 65), with this processing then being repeated for any other packets (step 66) to be processed for that tile.

Various arrangements would be possible in this regard.

Similarly, it will be appreciated that the particular command types (and corresponding data types that are stored by those command types) are merely some examples of types of commands that may be included into a primitive list according to the present embodiment. Other examples of commands that may or may not be used would of course be possible depending on the features and modes of the graphics processing system in question and which data may therefore be desired to be indicated.

Thus, the foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing data for use by a graphics processor when generating a render output, the method comprising:

processing one or more sequences of primitives to produce, for respective sets of primitives within the one or more sequences of primitives, respective data structures storing data to be used when rendering the respective set of primitives to which the data structure relates, wherein a respective data structure for a given set of primitives comprises one or more sequences of commands, each sequence of commands corresponding to a respective one of the sequences of primitives being processed, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein a particular type of state command is operable and configured to variably store different types of state data relating to a certain set of properties that can be selectively enabled for a given sequence of primitives based on which of those properties are enabled for the sequence of primitives to which that state data relates, the method thus further comprising:

for a sequence of primitives for which a corresponding sequence of commands is to be included into a respective data structure:

determining, based on which one or more properties of the certain set of properties that can be selectively enabled for a given sequence of primitives are enabled for the sequence of primitives, a respective command format for such particular type of state command that is to be used for the sequence of commands corresponding to that sequence of primitives.

2. The method of claim 1, comprising including into the data structure in association with the sequence of commands, an indicator of the command format for such particular type of state command that is to be used for that sequence of commands.

3. The method of claim 1, wherein the data structures are produced for respective regions of the render output, the set of primitives for which a respective data structure is produced thus corresponding to the primitives that are to be rendered for the respective region of the render output to which the data structure relates.

4. The method of claim 3, wherein the render output is sub-divided into a plurality of regions for sorting, and wherein the respective data structure are produced for respective ones of the regions into which the render output is sub-divided for sorting.

5. The method of claim 3, wherein the respective regions for which the data structures are produced correspond to respective bounding boxes encompassing the respective sets of primitives within the data structures.

6. The method of claim 1, wherein the render output is sub-divided into a plurality of tiles for rendering, the method comprising:

performing a first, geometry sorting pass to sort the one or more sequences of primitives, the first, geometry sorting pass producing the respective data structures; and thereafter performing a second, rendering pass to render the tiles into which the render output is sub-divided for rendering, wherein the second, rendering pass uses the data structure produced by the first, geometry sorting operation to determine which primitives within the sequence of primitives to render for which tiles.

7. The method of claim 1, wherein the certain set of properties that can be selectively enabled for a given sequence of primitives, and for which the particular type of state command is operable and configured to store associated state data for, includes one or more of: (i) a variable shading rate; (ii) a layer index; (iii) a viewport index; (iv) a primitive point size or line width; and (v) a primitive identifier.

8. A method of processing data for use by a graphics processor when generating a render output, the method comprising:

obtaining, for a set of primitives, a respective data structure storing data to be used when rendering the respective set of primitives to which the data structure relates, the respective data structure comprising one or more sequences of commands, each sequence of commands corresponding to a respective sequence of primitives to be processed for the render output, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein a particular type of state command is operable and configured to variably store different types of state data relating to a certain set of properties that can be selectively enabled for a given sequence of primitives based on which of those properties are enabled for the sequence of primitives to which that state data relates, the method thus further comprising:

determining a respective command format for such particular type of state command that is to be used for a respective sequence of primitives for which a corresponding sequence of commands is included into the data structure; and when decoding the corresponding sequence of commands for the sequence of primitives, in response to encountering such particular type of state command, decoding that particular type of state command according to the determined command format for that sequence of primitives.

9. The method of claim 8, wherein determining a respective command format for such particular type of state command that is to be used for a respective sequence of primitives for which a corresponding sequence of commands is included into the data structure is performed using a respective indicator of the command format that is included into the data structure in associated with the sequence of commands.

10. The method of claim 8, wherein the data structures are produced for respective regions of the render output, the set of primitives for which a respective data structure is obtained thus corresponding to the primitives that are to be rendered for the respective region of the render output to which the data structure relates.

11. The method of claim 10, wherein the render output is sub-divided into a plurality of regions for sorting, and wherein the respective data structures are obtained for respective ones of the regions into which the render output is sub-divided for sorting.

12. The method of claim 10, wherein the respective regions for which the data structures are obtained correspond to respective bounding boxes encompassing the respective sets of primitives within the data structures.

13. The method of claim 8, wherein the render output is sub-divided into a plurality of tiles for rendering, and wherein obtaining, for a set of primitives, a respective data structure storing data to be used when rendering the respective set of primitives to which the data structure relates, is performed in respect of a tile that is being rendered during a second, rendering pass.

14. The method of claim 8, wherein the certain set of properties that can be selectively enabled for a given sequence of primitives, and for which the particular type of state command is operable and configured to store associated state data for, includes one or more of: (i) a variable shading rate; (ii) a layer index; (iii) a viewport index; (iv) a primitive point size or line width; and (v) a primitive identifier.

15. A method of operating a graphics processor to generate a render output in which the render output is sub-divided into a plurality of tiles for rendering, the method comprising:

performing a first, geometry sorting pass to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein there is a set of different available command types that can be included into the data structure for storing different types of data, and wherein the set of different available command types includes a particular type of state command that is operable and configured to variably store different types of state data relating to a certain set of properties that can be selectively enabled for a given sequence of primitives based on which of those properties are enabled for the sequence of primitives to which that state data relates;

the method further comprising:

thereafter performing a second, rendering pass to render the tiles into which the render output is sub-divided for rendering, wherein the second, rendering pass uses the data structures produced by the first, geometry sorting operation to determine which primitives within the sequence of primitives to render for which tiles, whereby for a tile to be rendered, the method comprises:

obtaining a respective data structure relating to a region of the render output encompassed by that tile and decoding the commands within the respective data structure to determine the primitive data and associated state data to be used when rendering that tile, wherein when such a particular type of state command is encountered within the data structure, the particular type of state command is decoded based on which of the one or more properties of the set of properties that can be selectively enabled for a sequence of primitives are enabled for the sequence of primitives to which that particular type of state command relates.

16. The method of claim 15, wherein when producing a respective data structure during the first, geometry sorting pass, the method further comprises:

for a sequence of primitives for which a corresponding sequence of commands is to be included into a respective data structure:

determining, based on which one or more properties of the certain set of properties that can be selectively enabled for a given sequence of primitives are enabled for the sequence of primitives, a respective command format for such particular type of state command that is to be used for the sequence of commands corresponding to that sequence of primitives.

17. The method of claim 16, further comprising including into the data structure in association with the sequence of commands, an indicator of the command format for such particular type of state command that is to be used for that sequence of commands.

18. The method of claim 15, the render output is sub-divided into a plurality of regions for sorting, and wherein the respective data structure are produced for respective ones of the regions into which the render output is sub-divided for sorting.

19. The method of claim 15, wherein the respective regions for which the data structures are produced correspond to respective bounding boxes encompassing the respective sets of primitives within the data structures.

20. The method of claim 15, wherein the certain set of properties that can be selectively enabled for a given sequence of primitives, and for which the particular type of state command is operable and configured to store associated state data for, includes one or more of: (i) a variable shading rate; (ii) a layer index; (iii) a viewport index; (iv) a primitive point size or line width; and (v) a primitive identifier.

21. A graphics processing system including a graphics processor that is operable to generate a render output in which the render output is sub-divided into a plurality of tiles for rendering, the graphics processor comprising:

a geometry sorting circuit that is operable and configured to sort one or more sequences of primitives to be processed for the render output, the first, geometry sorting pass processing the one or more sequences of primitives to produce, for respective regions of the render output, corresponding data structures identifying respective sets of primitives that are to be rendered for the region of the render output to which the data structure relates, wherein a data structure produced by the first, geometry sorting pass for a respective region of the render output comprises one or more sequences of commands, each sequence of commands corresponding to a respective one of the sequences of primitives to be processed for the render output, and each sequence of commands including a respective set of primitive type commands for storing data identifying individual primitives that are to be rendered for the region of the render output to which the data structure relates and further including one or more state type commands for storing state data associated with respective processing operations to be performed when rendering those primitives, wherein there is a set of different available command types that can be included into the data structure for storing different types of data, and wherein the set of different available command types includes a particular type of state command that is operable and configured to variably store different types of state data relating to a certain set of properties that can be selectively enabled for a given sequence of primitives based on which of those properties are enabled for the sequence of primitives to which that state data relates; and a rendering circuit that is operable and configured to render the tiles into which the render output is subdivided for rendering, wherein the rendering circuit includes a reading circuit that is configured to read in data structures produced by the geometry sorting circuit to determine which primitives within the sequence of primitives to render for which tiles, whereby for a tile to be rendered, the reading circuit is configured to:

obtain a respective data structure relating to a region of the render output encompassed by that tile and decode the commands within the respective data structure to determine the primitive data and associated state data to be used when rendering that tile, wherein when such a particular type of state command is encountered within the data structure, the reading circuit decodes the particular type of state command based on which of the one or more properties of the set of properties that can be selectively enabled for a sequence of primitives are enabled for the sequence of primitives to which that particular type of state command relates.

* * * * *